United States Patent
Fehrenbach et al.

(10) Patent No.: US 12,126,562 B2
(45) Date of Patent: Oct. 22, 2024

(54) CONTROL RESOURCE SET GROUPING

(71) Applicant: Fraunhofer-Gesellschaft zur Förderung der angewandten Forschung e.V., Munich (DE)

(72) Inventors: Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Khaled Shawky Hassan Hussein, Erlangen (DE); Martin Leyh, Erlangen (DE); Thomas Heyn, Erlangen (DE); Bernhard Niemann, Erlangen (DE); Julian Popp, Erlangen (DE); Nithin Srinivasan, Berlin (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 307 days.

(21) Appl. No.: 17/580,449

(22) Filed: Jan. 20, 2022

(65) Prior Publication Data
US 2022/0263630 A1    Aug. 18, 2022

Related U.S. Application Data

(63) Continuation of application No. PCT/EP2020/069305, filed on Jul. 8, 2020.

(30) Foreign Application Priority Data

Jul. 23, 2019  (EP) ..................... 19187864
Nov. 8, 2019  (EP) ..................... 19207928

(51) Int. Cl.
*H04L 5/00*    (2006.01)

(52) U.S. Cl.
CPC .......... *H04L 5/0053* (2013.01); *H04L 5/0091* (2013.01)

(58) Field of Classification Search
CPC ...................... H04L 5/0053; H04L 5/0091
(Continued)

(56) References Cited

U.S. PATENT DOCUMENTS 11,540,152 B2 * 12/2022 Tiirola .................. H04W 72/23
11,716,611 B2 *  8/2023 Pan ......................... H04W 8/24
                                                      370/329
(Continued)

FOREIGN PATENT DOCUMENTS

CN    101061464 B  *  7/2012  ............ G06F 11/008
EP       3863356 A1  *  8/2021  ............. H04L 5/0044
(Continued)

OTHER PUBLICATIONS

Kwak et al., 5G_NR_PDCCH: Design and Performance, 2018 IEEE 5GWorld Forum, 6 pages (Year: 2018).*
(Continued)

*Primary Examiner* — Mong-Thuy T Tran
(74) *Attorney, Agent, or Firm* — Perkins Coie LLP; Michael A. Glenn

(57) ABSTRACT

A user device for a wireless communication system is served by a base station and uses one or more frequency bands for a communication with one or more entities in the wireless communication system. The frequency bands include CORESETs, each including one or more search spaces carrying control information for the UE. The UE groups some or all of the CORESETs into respective CORESET groups, or some or all of the search spaces into respective search space groups. A CORESET group includes some or all CORESETs within a certain time window, and a search space group includes some or all search spaces within the
(Continued)

certain time window. The grouping is responsive to one or more group IDs the UE is configured with, each group ID pointing to or indicating a CORESET group or a search space group, and/or determining CORESETs or search spaces to be within the same time window.

17 Claims, 19 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,818,728 B2* | 11/2023 | Khoshnevisan | H04W 72/23 |
| 11,825,491 B2* | 11/2023 | Pan | H04L 5/0053 |
| 2017/0099674 A1 | 4/2017 | Han et al. | |
| 2018/0227777 A1 | 8/2018 | Sun et al. | |
| 2018/0324843 A1 | 11/2018 | Lee et al. | |
| 2020/0245302 A1* | 7/2020 | Pan | H04L 5/0094 |
| 2020/0389874 A1* | 12/2020 | Lin | H04W 72/23 |
| 2021/0385008 A1* | 12/2021 | Hang | H04L 1/0038 |
| 2022/0159641 A1* | 5/2022 | Kim | H04W 72/20 |

FOREIGN PATENT DOCUMENTS

| | | |
|---|---|---|
| JP | 2020505874 A | 2/2020 |
| WO | 2016004560 A1 | 1/2016 |
| WO | 2018145094 A2 | 8/2018 |
| WO | 2018171807 A1 | 9/2018 |
| WO | 2019047156 A1 | 3/2019 |

OTHER PUBLICATIONS

Jalali et al., A New Algorithm for Improved Blind Detection of Polar Coded PDCCH in 5G New Radio, Feb. 27, 2019, IEEE, 12 pages (Year: 2019).*

3GPP "5G; NR; Physical Layer Procedures for Control" ETSI TS 138 213 V.15.5.0; (May 2019). 106 pages.

3GPP "5G; NR; Radio Resource Control (RRC); Protocol Specification" ETSI TS 138 331 V15.5.1; (May 2019). 488 pages.

IEEE "Part 11: Wireless LAN Medium Access Control (MAC) and Physical Layer (PHY) Specifications" IEEE Std 802.11 (1997). 466 pages.

Oppo "Enhancements on multi-TRP and multi-panel transmission", 3GPP TSG RAN WG1 Meeting #97; Reno, USA, May 13-17, 2019. 11 pages.

Zte "On multi-PDCCH design for multi-TRP" R1-1906242; 3GPP TSG RAN WG1 #97; Reno, USA, May 13-17, 2019. 4 pages.

Zte et al. "Consideration on Enhancement of TCI-State MAC CE for Muliti-TRP transmission" R2-1906125; 3GPP TSG-RAN WG2 Meeting # 106; Reno, USA, May 13-17, 2019. 7 pages.

3GPP, "Physical layer procedures for control", TS38.213 v15.6.0, NR, 3GPP server release date (Jun. 24, 2019.), Jun. 24, 2019.

Ericsson, "Summary of view for beam measurement and reporting—v2", R1-1814065, 3GPP TSG RAN WG1 #95, 3GPP server release date (Nov. 19, 2018.), Nov. 19, 2018.

Intel Corporation, "Correction to Beam Management", R1-1812467, 3GPP TSG RAN WG1 #95, 3GPP server release date (Nov. 3, 2018.), Nov. 3, 2018.

Intel Corporation, "On multi-TRP/multi-panel transmission", R1-1907559, 3GPP TSG RAN WG1 #97, 3GPP server release date (May 7, 2019.).

LG Electronics, "Physical layer design of DL signals and channels for NR-U", R1-1904620, 3GPP TSG RAN WG1 #96bis, 3GPP server release date (Mar. 30, 2019.), Mar. 30, 2019.

Samsung, "Search Space Design", R1-1713613, 3GPP TSG RAN WG1 #90, 3GPP server release date (Aug. 11, 2017.), Aug. 11, 2017.

Vivo, "Discussion on 2-step RACH procedure", 3GPP TSG RAN WG1 #97 R1-1906125, 2019.

Vivo, "Further Discussion on Multi-TRP Transmission", R1-1904096, 3GPP TSG RAN WG1 #96bis, 3GPP server release date (Mar. 30, 2019.), Mar. 30, 2019.

* cited by examiner

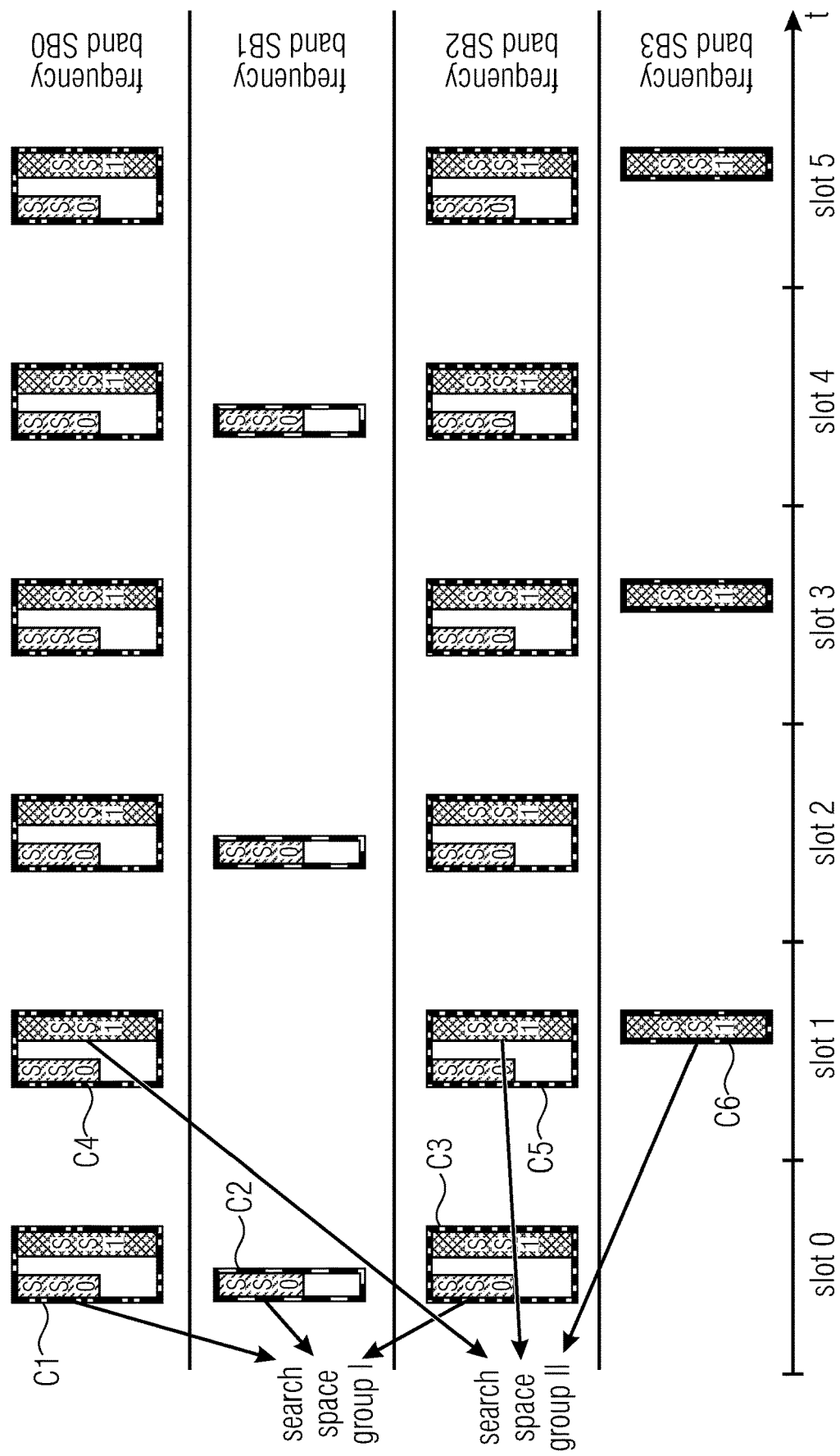

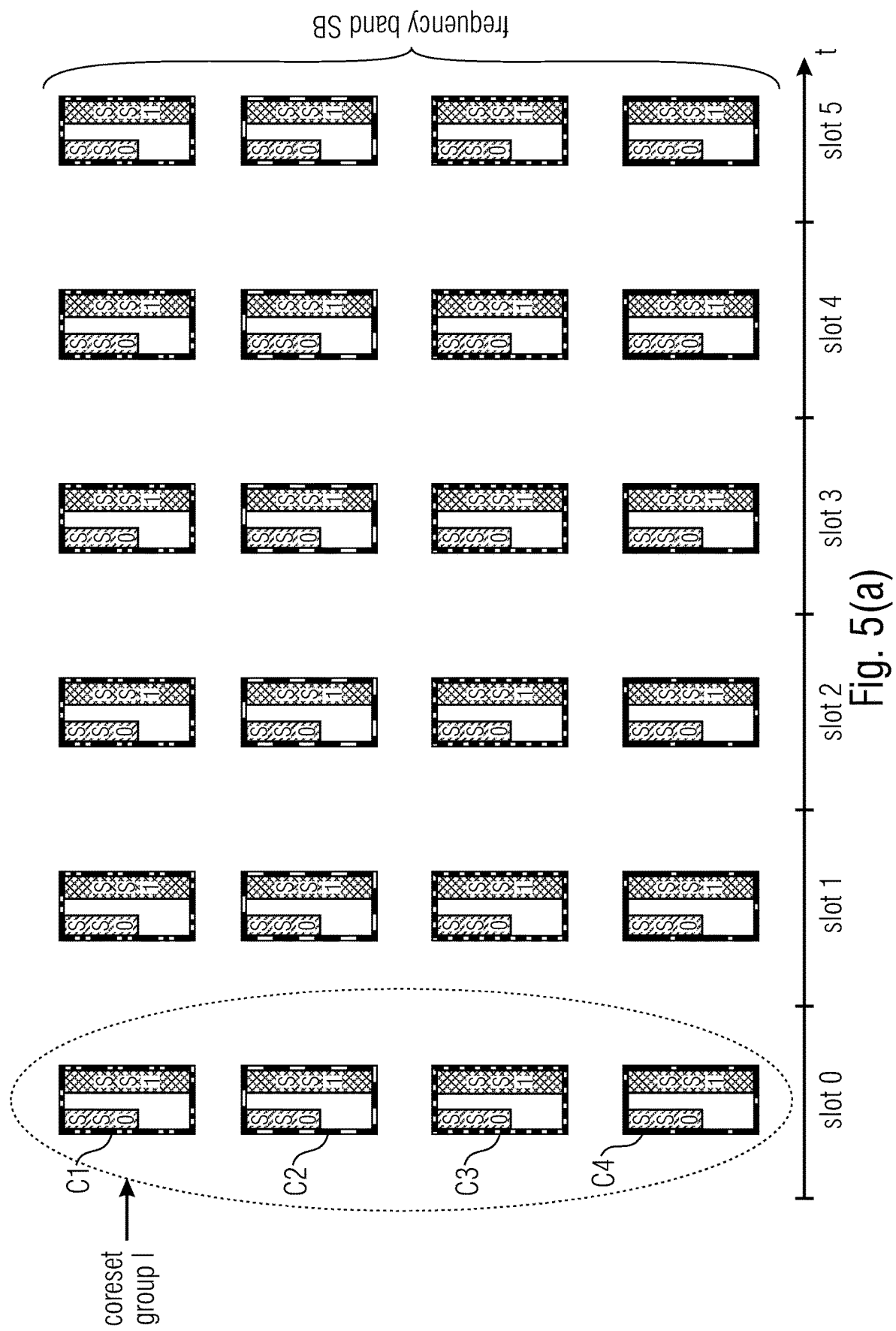

CONTROL RESOURCE SET GROUPING

CROSS-REFERENCES TO RELATED APPLICATIONS

This application is a continuation of copending International Application No. PCT/EP2020/069305, filed Jul. 8, 2020, which is incorporated herein by reference in its entirety, and additionally claims priority from European Applications Nos. EP 19187864.4, filed Jul. 23, 2019, and EP 19207928.3, filed Nov. 8, 2019, both of which are incorporated herein by reference in their entirety.

The present application concerns the field of wireless communication systems or networks, more specifically, enhancements or improvements in the communication among entities of the wireless communication network. Embodiments concern enhancements or improvements for obtaining control information, like DCI or SCI, for one or more user devices from multiple CORESETs in a single-band operation or in a multi-band operation, for example, a NR-U operation or a NR carrier aggregation operation.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAND may include more or less such cells, and $RAN_D$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations gNB2, $gNB_4$ or for transmitting data from the base stations gNB2, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard, or the 802.11ax, or the 802.11be.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using one of more frequency bands. A frequency band includes a start frequency, an end frequency and all intermediate frequencies between the start and end frequencies. In other words, the start, end and intermediate frequencies may define a certain bandwidth, e.g., 20 MHz. A frequency band may also be referred to as a carrier, a bandwidth part, BWP, a subband, and the like.

When using a single frequency band, the communication may be referred to as a single- band operation, e.g., a UE transmits/receives radio signals to/from another network entity on frequencies being within the 20 MHz band.

When using a two or more frequency bands, the communication may be referred to as a multi-band operation or as a wideband operation or as a carrier aggregation operation. The frequency bands may have different bandwidths or the same bandwidth, like 20 MHz. For example, in case of frequency bands having the same bandwidths a UE may transmit/receive radio signals to/from another network entity on frequencies being within two or more of the 20 MHz bands so that the frequency range for the radio communication may be a multiple of 20 MHz. The two or more frequency bands may be continuous/adjacent frequency bands or some or all for the frequency bands may be separated in the frequency domain.

The multi-band operation may include frequency bands in the licensed spectrum, or frequency bands in the unlicensed spectrum, or frequency bands both in the licensed spectrum and in the unlicensed spectrum.

Carrier aggregation, CA, is an example using two or more frequency bands in the licensed spectrum and/or in the unlicensed spectrum.

5G New Radio (NR) may support an operation in the unlicensed spectrum so that a multi-band operation may include frequency bands in the unlicensed spectrum bands. This may be as NR-based access to unlicensed spectrum, NR-U, and the frequency bands may be referred to as subbands. The unlicensed spectrum may include bands with a potential IEEE 802.11 coexistence, such as the 5 GHz and the 6 GHz bands. NR-U may support bandwidths that are an integer multiple of 20 MHz, for example due to regulatory requirements. The splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use subbands having subband sizes and nominal frequencies different from the above-described IEEE 802.11 systems. For example, the unlicensed spectrum may include the 5 GHz band, the 6 GHz band, the 24 GHz band or the 60 GHz band. Examples of such unlicensed bands include the industrial, scientific and medical, ISM, radio bands reserved internationally for the use of radio frequency energy for industrial, scientific and medical purposes other than telecommunications.

During an operation using unlicensed subbands, Listen-before-talk, LBT, is to be performed separately per subband. This may lead to a situation in which one or more of the subbands are busy or occupied due to an interference, for example, from other communication systems coexisting on the same band, like other public land mobile networks, PLMNs or systems operating in accordance with the IEEE 802.11 specification. In such a situation, the transmitter, either the transmitting gNB or the transmitting UE, is only allowed to transmit on the subbands which are detected to be not busy, also referred to as subbands being free or non-occupied, as is determined by the LBT algorithm. For example for a transmission spanning more than 20 MHz in the 5 GHz operational unlicensed band, the transmitter, like the gNB or the UE, performs Listen-Before-Talk, LBT, separately on each subband. Once the LBT results are available for each subband, the devices, for example, the gNB in the downlink, DL, or the UE in the uplink, UL, are allowed to transmit on those subbands which are determined to be free or unoccupied, i.e., to transmit on the won subband(s). No transmission is allowed on the occupied, busy or non-won subbands.

SUMMARY

An embodiment may have a user device, UE, for a wireless communication system,
wherein the UE is to be served by a base station and is to use one or more frequency bands for a communication with one or more entities, e.g., other UE(s) or other gNB(s) in the wireless communication system, wherein one or more or all of the frequency bands include one or more CORESETs, each CORESET including one or more search spaces carrying control information, e.g., DCI(s), for the UE,
  wherein the UE is to group
  some or all of the CORESETs into respective CORESET groups, or
  some or all of the search spaces into respective search space groups,
  wherein a CORESET group includes some or all CORESETs within a certain time window, and wherein a search space group includes some or all search spaces within the certain time window, and
  wherein the grouping is responsive to
  one or more group IDs the UE is configured with, each group ID pointing to or indicating a CORESET group or a search space group, and/or
  determining CORESETs or search spaces to be within the same time window.

Another embodiment may have a user device, UE, for a wireless communication system,
wherein the UE is to be served by a base station and is to use one or more frequency bands for a communication with one or more entities, e.g., other UE(s) or other gNB(s), in the wireless communication system, wherein one or more or all of the frequency bands include one or more CORESETs carrying control information, e.g., DCI(s), for the UE,
  wherein the control information of some or all of the CORSETs indicate in which of the CORSETs control information for the UE is present.

Yet another embodiment may have a user device, UE, for a wireless communication system,
wherein the UE is to be served by a base station and is to use a plurality of frequency bands for a communication with one or more entities, e.g., other UE(s) or other gNB(s), in the wireless communication system, wherein some, e.g., two or more, or all of the plurality of frequency bands include one or more CORESETs carrying control information, e.g., DCI(s), for the UE,
  wherein the UE is to decode the control information, e.g., DCI(s), from one or more of the CORESETs, and wherein in one or more neighboring frequency bands one or more of the CORESETs are located within a pre-defined continuous frequency range extending in both neighboring frequency bands.

Still another embodiment may have a user device, UE, for a wireless communication system, wherein the UE is to be served by a base station and is to use one or more frequency bands for a communication with one or more entities, e.g., other UE(s) or other gNB(s), in the wireless communication system, wherein one or more or all of the frequency bands include one or more CORESETs carrying control information, e.g. DCI(s), for the UE, and wherein one or more backup CORESETs are provided in one or more of the frequency bands.

An embodiment may have a base station, BS, for a wireless communication system, wherein the BS is to serve one or more UEs and is to use one or more frequency bands for a communication with the one or more UEs in the wireless communication system, wherein one or more or all of the frequency bands include one or more CORESETs carrying control information for the one or more UEs, and wherein the BS is to configure, e.g., using RRC signaling, the one or more UEs with one or more group IDs, each group ID pointing to or indicating a group of one or more other CORESETs or one or more search spaces, wherein a CORESET group includes some or all CORESETs within a certain time window, and wherein a search space group includes some or all search spaces within the certain time window.

Another embodiment may have a base station, BS, for a wireless communication system, wherein the BS is to serve one or more UEs and is to use one or more frequency bands for a communication with one or more UEs in the wireless communication system, wherein one or more or all of the frequency bands include one or more CORESETs carrying control information, e.g., DCI(s), for the UE, wherein the control information of some or all of the CORSETs indicate in which of the CORSETs in one or more other of the frequency bands control information for a receiving UE is present.

Yet another embodiment may have a base station, BS, for a wireless communication system, wherein the BS is to serve one or more UEs and is to use a plurality of frequency bands for a communication with the one or more UEs, wherein some, e.g., two or more, or all of the plurality of frequency bands include one or more CORESETs carrying control information, e.g., DCI(s), for the one or more UEs, wherein the BS is to transmit CORESETs of one or more neighboring frequency bands within a pre-defined continuous frequency range extending both in both neighboring frequency bands.

Still another embodiment may have a base station, BS, for a wireless communication system, wherein the BS is to serve one or more UEs and is to use
  one or more frequency bands for a communication with
    the one or more UEs in the wireless communication
    system, wherein one or more or all of the frequency
    bands include one or more CORESETs carrying control
    information, e.g., DCI(s), for the UE, and wherein the BS is to configure the one or more UEs with one or more backup CORESETs in the one or more frequency bands.

Still another embodiment may have a base station, BS, for a wireless communication system, wherein the BS is to serve one or more UEs and is to use a plurality of frequency bands for a communication with the one or more UEs in the wireless communication system, wherein one or more or all of the plurality of frequency bands include one or more CORESETs carrying control information, e.g., DCI(s), for the UE, and wherein some or all of the plurality of frequency bands are unlicensed frequency bands on which a communication is allowed for a certain transmission time (COT) responsive to a successful Listen-Before-Talk, LBT, wherein, responsive to an unsuccessful or failed LBT on one or more of the unlicensed frequency bands, the BS is to distribute the control information for the one or more UEs among the one or more frequency bands available for the communication, e.g., among one or more frequency bands which passed the LBT.

According to an embodiment, a wireless communication system may have:

one or more inventive UEs, and one or more inventive BSs.

An embodiment may have a method for operating a wireless communication system, wherein a UE is served by a base station and uses one or more frequency bands for a communication with one or more entities, e.g., other UE(s) or other gNB(s) in the wireless communication system, wherein one or more or all of the frequency bands include one or more CORESETs, each CORESET including one or more search spaces carrying control information, e.g., DCI (s), for the UE, wherein method may have the step of grouping some or all of the CORESETs into respective CORESET groups, or some or all of the search spaces into respective search space groups, wherein a CORESET group includes some or all CORESETs within a certain time window, and wherein a search space group includes some or all search spaces within the certain time window, and wherein the grouping is responsive to
    one or more group IDs the UE is configured with, each
      group ID pointing to or indicating a CORESET group
      or a search space group, and/or
    determining CORESETs or search spaces to be within the
      same time window.

Another embodiment may have a method for operating a wireless communication system, wherein a UE is served by a base station and uses one or more frequency bands for a communication with one or more entities, e.g., other UE(s) or other gNB(s), in the wireless communication system, wherein the one or more or all of the frequency bands include one or more CORESETs carrying control information, e.g., DCI(s), for the UE, wherein the method may have the step of indicating in the control information of some or all of the CORSETs in which of the CORSETs control information for the UE is present.

Yet another embodiment may have a method for operating a wireless communication system, wherein the UE is served by a base station and uses a plurality of frequency bands for a communication with one or more entities, e.g., other UE(s) or other gNB(s), in the wireless communication system, wherein some, e.g., two or more, or all of the plurality of frequency bands include one or more CORESETs carrying control information, e.g., DCI(s), for the UE, wherein the UE decodes the control information, e.g., DCI(s), from one or more of the CORSETs, and wherein the method may have the step of locating in one or more neighboring frequency bands one or more of the CORESETs within a pre-defined continuous frequency range extending in both neighboring frequency bands.

Still another embodiment may have a method for operating a wireless communication system, wherein the UE is served by a base station and uses one or more frequency bands for a communication with one or more entities, e.g., other UE(s) or other gNB(s), in the wireless communication system, wherein one or more or all of the frequency bands include one or more CORESETs carrying control information, e.g. DCI(s), for the UE, and wherein the method may have the step of providing one or more backup CORESETs in one or more of the frequency bands.

Another embodiment may have a method for operating a wireless communication system, wherein a BS serves one or more UEs and uses a plurality of frequency bands for a communication with the one or more UEs in the wireless communication system, wherein one or more or all of the plurality of frequency bands include one or more CORESETs carrying control information, e.g., DCI(s), for the UE, and wherein some or all of the plurality of frequency bands are unlicensed frequency bands on which a communication is allowed for a certain transmission time (COT) responsive to a successful Listen-Before-Talk, LBT, wherein the method may have the step of, responsive to an unsuccessful or failed LBT on one or more of the unlicensed frequency bands, distributing, by the BS, the control information for the one or more UEs among the one or more frequency bands available for the communication, e.g., among one or more frequency bands which passed the LBT.

According to another embodiment, a non-transitory digital storage medium may have a computer program stored thereon to perform the inventive methods, when said computer program is run by a computer.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements in a wireless communication system for obtaining control information for one or more user devices in a multi-band operation, like a NR-U wideband operation.

BRIEF DESCRIPTION OF THE DRAWINGS

Embodiments of the present invention will be detailed subsequently referring to the appended drawings, in which:

FIGS. 4(a)-4(b) illustrates an embodiment of applying search space grouping in accordance with the inventive approach, wherein FIG. 4(a) illustrates a single-band communication similar as in FIG. 3(a), and FIG. 4(b) illustrates a multi-band communication similar as in FIG. 3(b);

FIGS. 5 (a)-5(b) illustrates an embodiment of applying CORESET grouping in accordance with the inventive approach, wherein FIG. 5(a) illustrates a single-band communication similar as in FIG. 3(a)

FIG. 13 illustrates embodiments providing for an explicit relationship between

Figure 14:
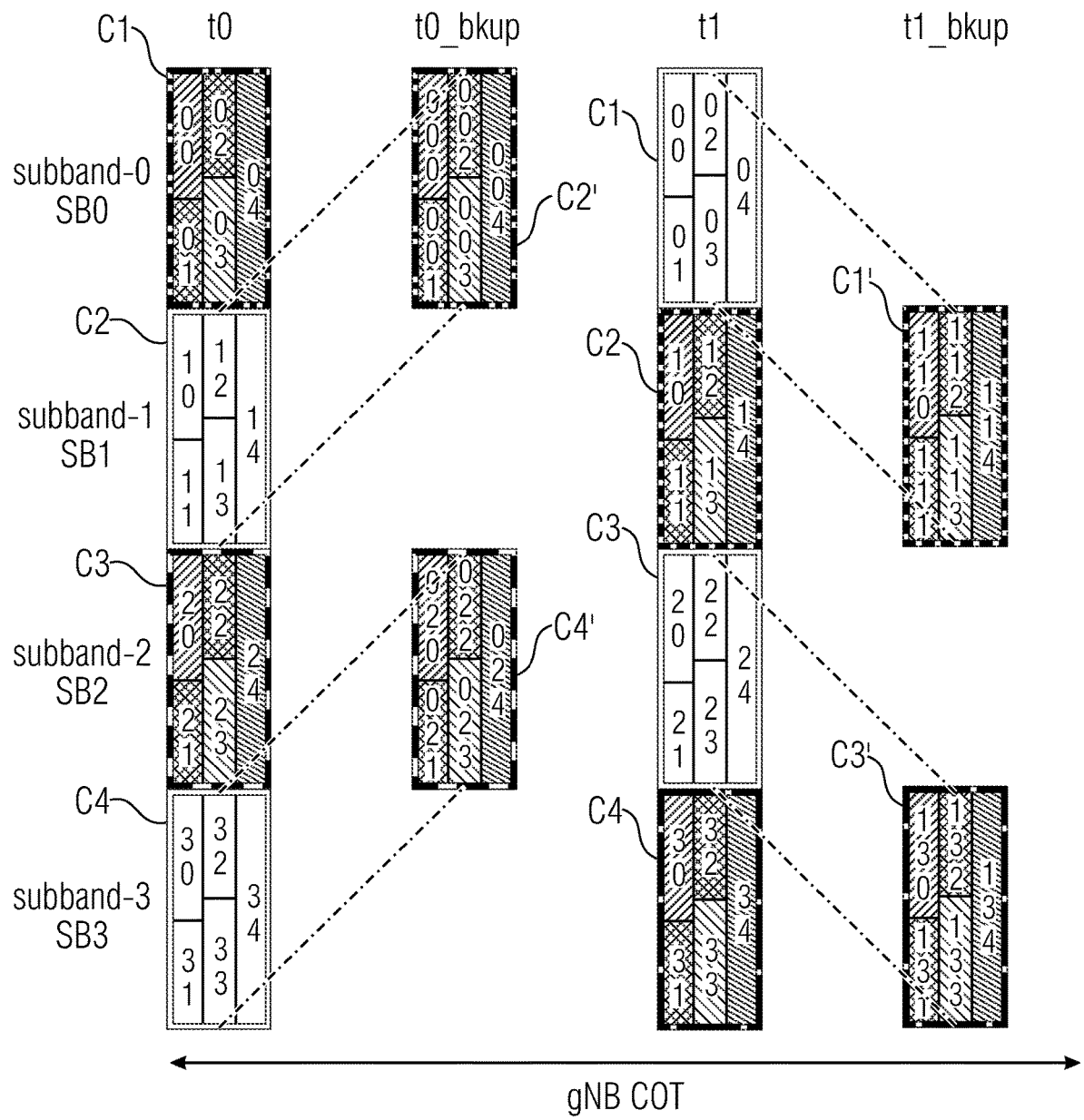
Figure 15:
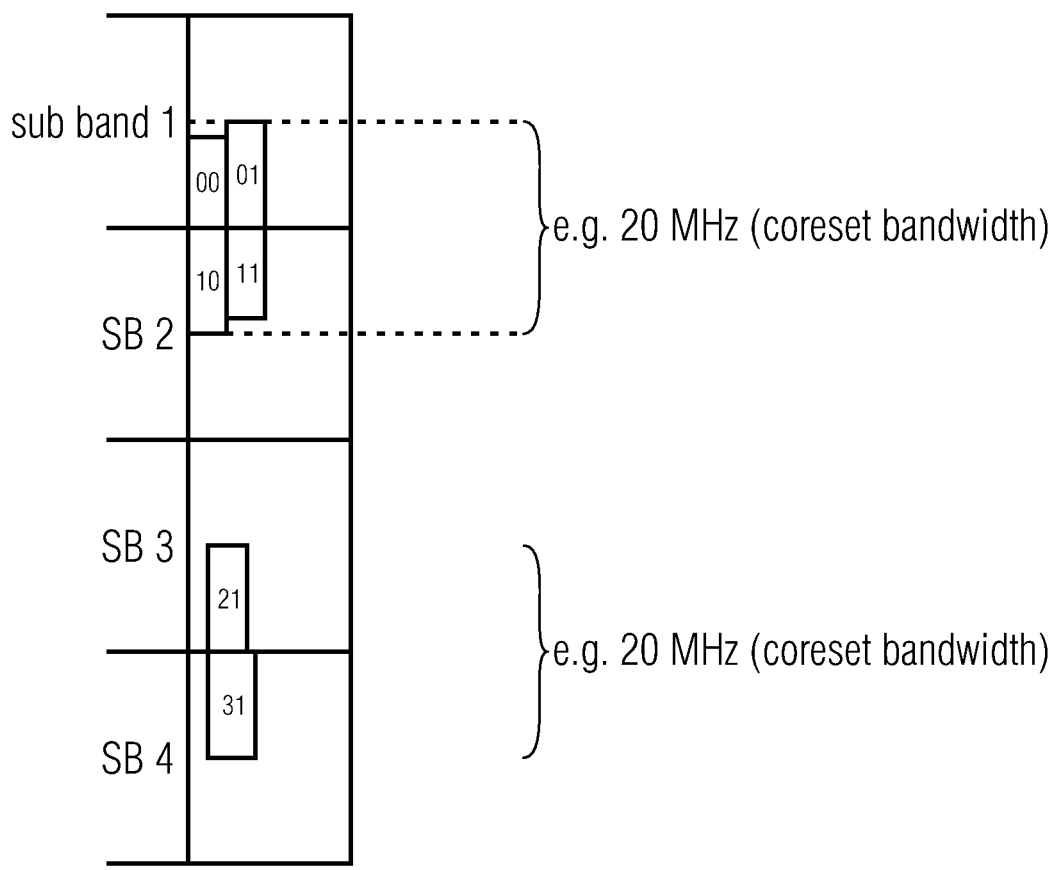
Figure 16:
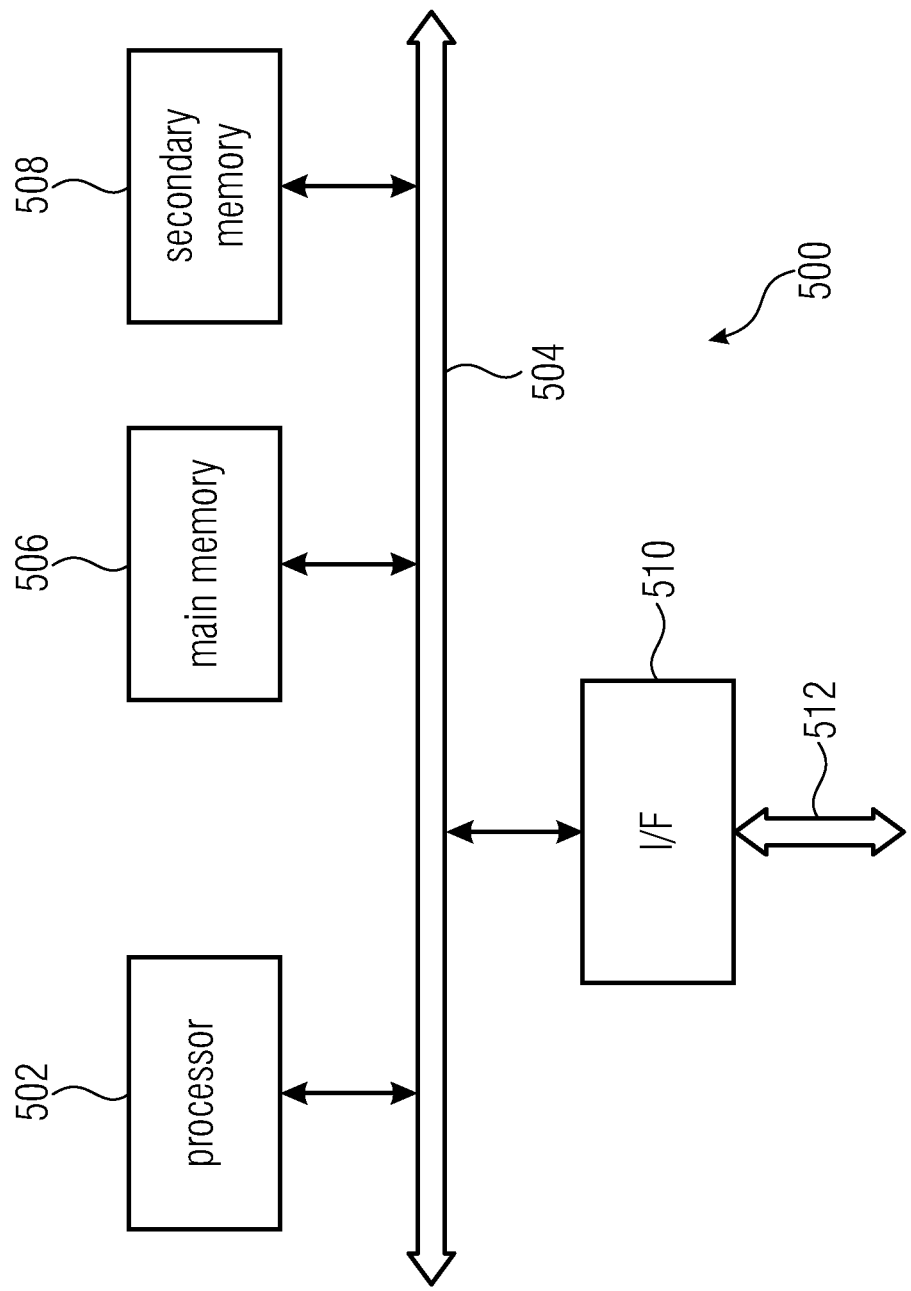

CORESETs of a group;

FIG. 14 illustrates an embodiment for providing backup CORESETs to be used within one or more frequency bands;

FIG. 15 illustrates schematically an embodiment restricting the search space to frequency band borders; and FIG. 16 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings in which the same or similar elements have the same reference signs assigned.

In wireless communication systems or networks as described above, control information for users may be provided in a so-called control resource set, CORESET. The CORESET is a collection of time/frequency resources dedicated to the transmission of the control information, e.g. the PDCCH which carries the downlink control information, DCI, or scheduling information for respective UEs being within a certain cell or coverage area of a base station, gNB, or being served by the gNB. A CORESET may include a common search space, CSS, that is common across all the UEs in the cell and/or a UE specific search space, USS, that is specific to a particular UE in the cell. Within the CORESET, based on the distance, the channel conditions or reliability requirements between the UE and the gNB, the gNB may assign different aggregation levels, ALs, per DCI per UE so as to maintain a certain reliability of decoding the PDCCH. As a result, the UEs having a higher AL may involve a larger allocation of the time/frequency resources within the CORESET.

A UE does not have prior knowledge of the AL and, therefore, considers all possible aggregation levels which are indicated in the search space configurations of the CORESET. Currently, the aggregation level may be 1, 2, 4, 8 and 16, meaning that a certain PDCCH has allocated 1, 2, 4, 8 or 16 control channel elements, CCEs. Considering all possible aggregation levels means that the UE performs blind decoding for each AL. More specifically, blind decoding the CORESET initially involves extracting the appropriate time/frequency resources associated with the CORESET, as specified, for example, by a certain radio resource control, RRC, configuration. Then, for each AL, the UE performs a certain number of decodings on the extracted resources to check the result of the CRC. Based on the result of the CRC, the UE may consider the DCI meant for itself and it may continue to decode the subsequent PDCCH channels. When considering a communication using a plurality of subbands, like a wideband operation in NR-U, for obtaining control information, the UE needs to perform the decoding at least in such subbands that carry the control information or that include CORESETs.

In case of the above-described single-band operation, the frequency band may include a plurality of CORESETs provided at different time/frequency resources within the frequency band.

In case of the above-described multi-band operation, one or more or all of the frequency bands may include one or more CORESETs that are provided at certain time/frequency resources within the frequency bands.

A receiver, like a UE, may be configured with respective CORESET configurations indicating the CORESETs including search spaces carrying control information for this UE.

When considering an operation in the licensed spectrum, the base station or gNB may decide not to transmit a CORESET in one or more of the frequency bands, e.g., because no control information is available for a transmission or a more stringent transmission has to be transmitted. For example, a high priority packet for a URLLC device may arrive and the gNB may decide to prioritize the high priority packet over the CORESET transmission. This leads to an increased blind decoding effort of the UE. The UE may first scan for the presence of a CORESET, e.g. using a DMRS correlation, or monitor an indication from the gNB, e.g. DL reserved regions, in order to detect that no CORESET is transmitted by the gNB, and then perform blind decoding only on the CORESETs whose presence is detected or indicated by the gNB. Thus, an increase of power consumption and, in turn, a reduction in energy efficiency, may occur in systems operating in one or more frequency bands of the licensed spectrum. More specifically, in systems operating in one or more frequency bands of the licensed spectrum a UE has to do the blind decoding on all CORESETs in one or more of the frequency bands used. Even in case of a single -band setup, i.e., when only one frequency band is used, there may be two or more CORESETs in this one frequency band and then again the UE has to do the blind decoding independently for all the CORESETs which leads to an increase of power consumption.

In case of the above-described multi-band operation in which some or all of the frequency bands are in the unlicensed spectrum, additional uncertainty is introduced due to the result of the LBT procedure for a NR-U gNB as the UEs connected to the gNB perform a blind decoding of the control channel, PDCCH, across all the unlicensed subbands. Some of the unlicensed subbands, also referred to as LBT subbands, may be configured with a respective CORESET which needs to be decoded by a UE which, inherently, reduces the energy/power efficiency, like the battery lifetime, at the UE side. In other words, in the NR- U wideband-operation scenario in which some or all of the subbands are unlicensed bands, the UE scheduling or control information may span across all or some of the subbands so that the UE may perform a blind decoding on each of the subbands independently. This leads to an increase in power consumption at the UE. In addition to the blind decoding overhead across all the unlicensed subbands, there may also be a dependence on the outcome of the LBT procedure. For example, the UE may first scan all the subbands using a reference signal decorrelation, like a DMRS decorrelation, so as to check the result of the LBT procedure and then perform blind decoding of the PDCCH across those subbands where the LBT is successful. Thus, since the result of the LBT procedure is probabilistic, there is a further reduction of the energy efficiency at the UE.

Information regarding the result of a LBT procedure, i.e., information which subbands are available for reception, may be transmitted in the group-common, GC, PDCCH as part of the CCEs of a CORESET. Since the LBT procedure may be applied several times during a gNB COT, the UE performs the blind decoding of the CG-PDCCH at the corresponding number of times within the COT also resulting in an increase of power consumption and, in turn, a reduction in energy efficiency.

Thus, an increase of power consumption and, in turn, a reduction in energy efficiency, may also occur in NR-U systems.

Embodiments of the present invention provide improvements and enhancements addressing the above issues and reducing or avoiding an increase in power consumption and a reduction in energy efficiency when communicating over one or more frequency band carrying control information to be obtained by the UE or different service types which may preempt a CORESET transmission are served simultaneously by the same serving cell or the gNB is optimized to reduce the CORESET transmissions if possible to increase the available bandwidth for data transmissions.

Figure 1A:
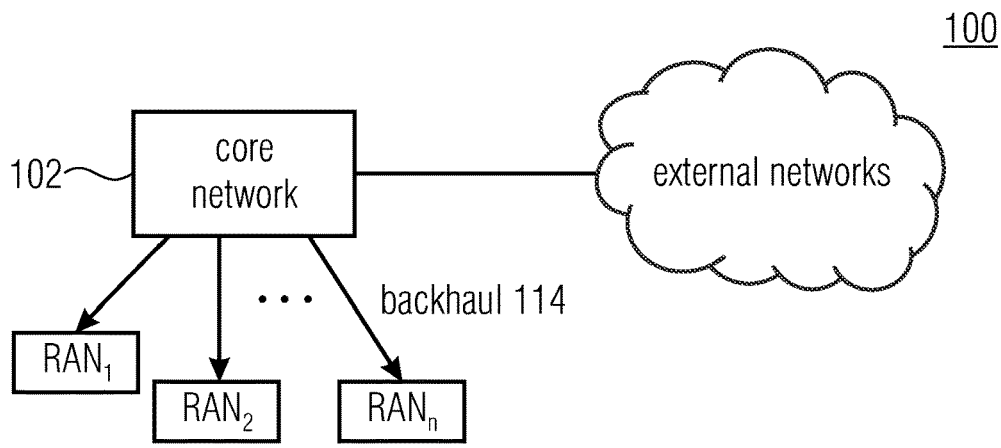
FIGS. 1(a)-1(b) shows a schematic representation of an example of a wireless communication system.
Figure 1B:
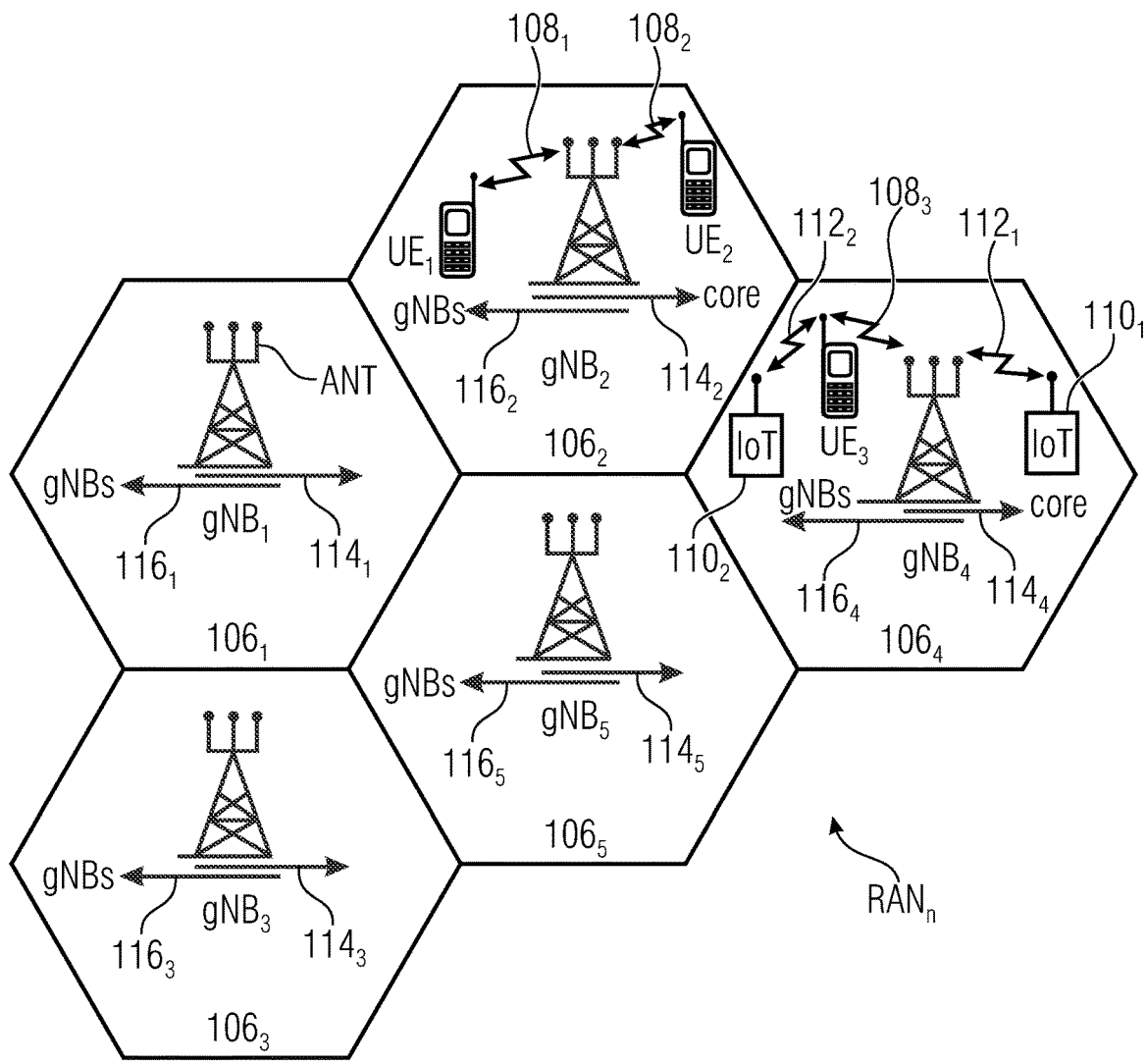
Figure 2:
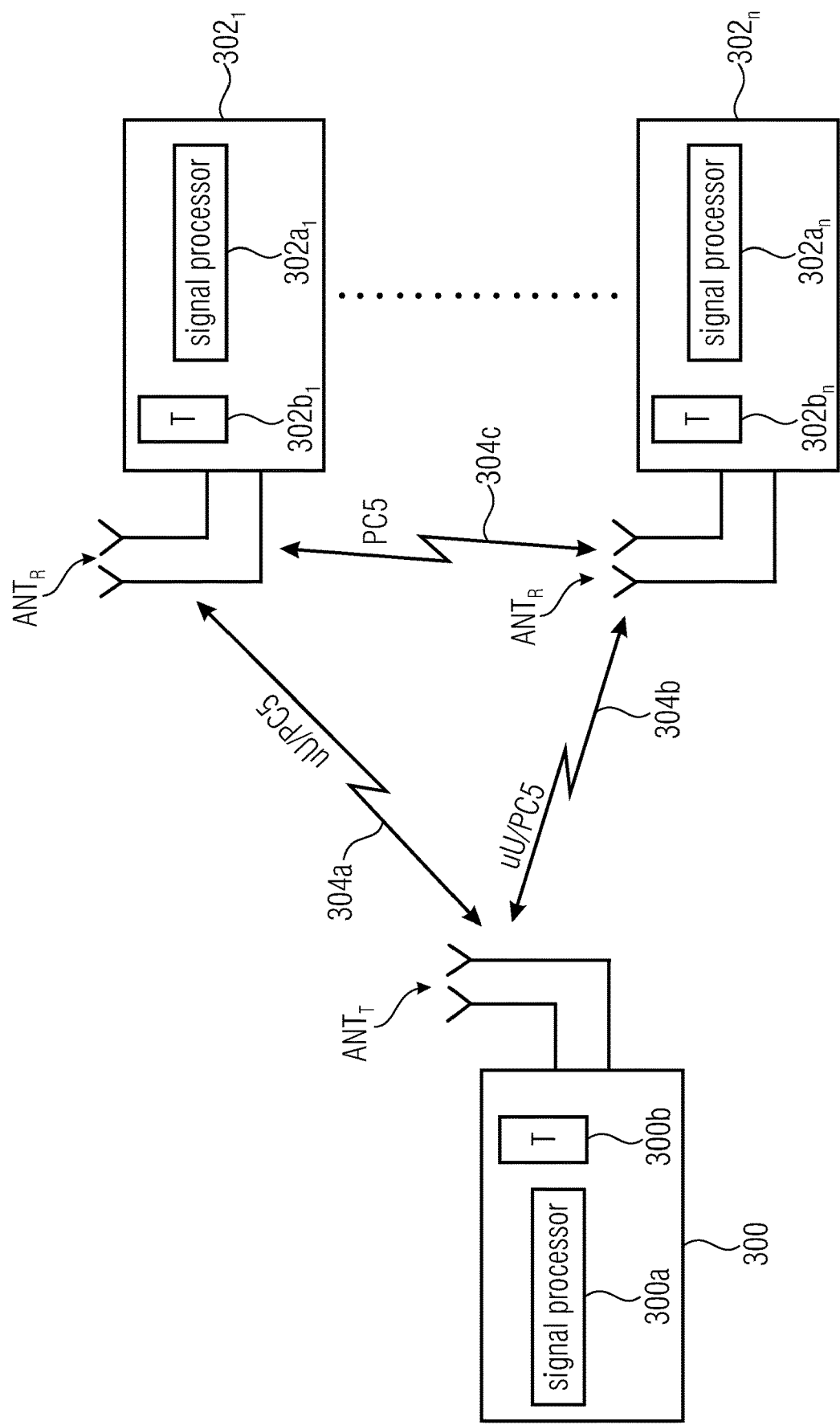
FIG. 2 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 2 is a schematic representation of a wireless communication system including a transmitter 300, like a base station, and one or more receivers $302_1$ to $302_n$, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas ANTR or an antenna array having a plurality of antennas, a signal processor 302ai, 302an, and a transceiver 302b1, 302bn coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

User Device

The present invention provides a user device, UE, for a wireless communication system, wherein the UE is to be served by a base station and is to use one or more frequency bands for a communication with one or more entities, e.g., other UE(s) or other gNB(s) in the wireless communication system, wherein one or more or all of the frequency bands include one or more CORESETs, each CORESET including one or more search spaces carrying control information, e.g., DCI(s), for the UE,
  wherein the UE is to group
    some or all of the CORESETs into respective CORESET groups, or
    some or all of the search spaces into respective search space groups,
  wherein a CORESET group includes some or all CORESETs within a certain time window, and wherein a search space group includes some or all search spaces within the certain time window, and
  wherein the grouping is responsive to
    one or more group IDs the UE is configured with, each group ID pointing to or indicating a CORESET group or a search space group, and/or
    determining CORESETs or search spaces to be within the same time window.

In accordance with embodiments, the UE is to use one frequency band for the communication, and a CORESET group/search space group includes some or all CORESETs/search spaces in the one frequency band that are provided within a certain time window, or the UE is to use a plurality of frequency bands for the communication, and a CORESET group/search space group includes some or all CORESETs/search spaces in one or more or all of the plurality of frequency bands that are provided within a certain time window.

In accordance with embodiments, the certain time window comprises one or more slots or a plurality of consecutive symbols.

In accordance with embodiments, the UE is to group the search spaces further based on one or more of the following parameters in a search space information element (SearchSpace):
  searchSpaceId
  monitoringSlotPeriodicityAndOffset
  duration
  monitoringSymbolsWithinSlot
  searchSpaceType
  dciFormats In accordance with embodiments, the UE is to be configured with a CORESET group information element, the CORESET group information element indicating CORESET configurations to be considered for the grouping.

In accordance with embodiments, the UE is to be configured, e.g., using RRC signaling, with one or more CORESET information elements (ControlResourceSet), wherein a CORESET information element includes the group ID (groupIndex) so as to indicate which CORESET configurations to consider for the grouping.

In accordance with embodiments, the UE is to be configured with a search space group information element, the search space group information element indicating search spaces and associated CORESETs being part of the same search space group.

In accordance with embodiments, the UE is to be configured, e.g., using RRC signaling, with one or more CORESET information elements (ControlResourceSet) and one or more search space information elements (SearchSpace), wherein a search space information element includes a search space group indication element (searchSpaceGroup) including the group ID (groupindex).

In accordance with embodiments, the UE is to be configured with a parameter activating or deactivating the grouping.

In accordance with embodiments, the UE is to coordinate decoding the control information for the UE from the search spaces using the grouping, wherein the decoding may include blind decoding.

In accordance with embodiments, the UE is to concatenate or combine the CORESETs or the search spaces of a group, whereby a virtual CORESET or a virtual search space is defined.

In accordance with embodiments, the UE is to not expect more than one or more particular control parameters, e.g., one DL assignment per serving cell, or one UL grant per serving cell, within the virtual search space or the virtual CORESET.

In accordance with embodiments, the UE is to receive a default CORESET configuration for a group, and to configure the remaining CORESETs of the group according to the default CORESET configuration.

In accordance with embodiments, to configure the one or more CORESETs, the UE is to apply at least a part of a search space configuration of the default CORESET to the other CORESETs of the same group.

In accordance with embodiments, the default CORESET configuration is indicated:
  explicitly, e.g., by the BS; or
  implicitly, e.g., by the first received CORESET configuration or by a CORESET configuration having certain CORESET ID, e.g. lowest or highest ID.

In accordance with embodiments, the UE is to replicate a default CORESET configuration for further frequency domain monitoring locations in one or more subbands that are different from the subband associated with the default CORESET configuration.

In accordance with embodiments, in case the UE successfully finds control information, e.g., DCI(s), in a current CORESET having a certain aggregation level, AL, the UE is not to expect control information for itself, e.g., DCI(s), in a CORESET with another AL, or in case the UE successfully finds control information, e.g., DCI(s), in a current search space having a certain aggregation level, AL, the UE is not to expect control information for itself, e.g., DCI(s), in a search space with another AL.

In accordance with embodiments, the UE is to continue looking only for the certain AL in the current and in the other CORESETs/search spaces of the same CORESET group/search space group at least for the successfully decoded DCI format.

In accordance with embodiments, in case the UE successfully finds control information, e.g., DCI(s), in a current CORESET, the UE is not to expect control information for itself, e.g., DCI(s), in another CORESETs.

In accordance with embodiments, once the UE successfully decoded one PDCCH in a CORESET the UE is to stop or deactivate the blind decoding in other CORESETs of the CORESET group.

In accordance with embodiments, responsive to successfully detecting a PDCCH in a certain subband, e.g., in one of the frequency domain monitoring locations, i.e. a CORESET of a CORESET group, for a time window, e.g. a COT duration or an uninterrupted DL burst, the UE is to continue to blind decode only within the frequency domain monitoring location, i.e. a CORSET of a CORESET group, at which the PDCCH is found for the search space associated with the found PDCCH or a pre-configured subset or all search spaces which are associated with the CORESET group.

In accordance with embodiments, the CORESETs or search spaces of a certain group are prioritized or ranked, and wherein the UE is to blind decode the CORESETs or search spaces of the certain group according to the prioritization or ranking thereof.

In accordance with embodiments, the UE is to receive from the BS an indication of the prioritization or ranking of the CORESETs or the search spaces of the certain group, e.g., upon receiving the CORESET or search space configurations.

In accordance with embodiments, responsive to decoding control information, e.g., DCI(s), from a CORESET or from a search space of a group, the UE is to apply a timing before which the UE is not to accept a DL assignment or an UL grant, the timing selected dependent on the priority or rank of the CORESET or search space, wherein the timing may decrease with an increase in priority or rank.

In accordance with embodiments, the control information of some or all of the CORSETs indicate in which of the CORSETs out of the CORESET group control information for the UE is present.

The present invention provides a user device, UE, for a wireless communication system, wherein the UE is to be served by a base station and is to use one or more frequency bands for a communication with one or more entities, e.g., other UE(s) or other gNB(s), in the wireless communication system, wherein one or more or all of the frequency bands include one or more CORESETs carrying control information, e.g., DCI(s), for the UE, and wherein the control information of some or all of the CORSETs indicate in which of the CORSETs control information for the UE is present.

In accordance with embodiments, a CORSET includes a DCI pointing to or indicating the CORSETs including control information for the UE.

The present invention provides a user device, UE, for a wireless communication system, wherein the UE is to be served by a base station and is to use a plurality of frequency bands for a communication with one or more entities, e.g., other UE(s) or other gNB(s), in the wireless communication system, wherein some, e.g., two or more, or all of the plurality of frequency bands include one or more CORESETs carrying control information, e.g., DCI(s), for the UE, wherein the UE is to decode the control information, e.g., DCI(s), from one or more of the CORSETs, and wherein in one or more neighboring frequency bands one or more of the CORESETs are located within a pre-defined continuous frequency range extending in both neighboring frequency bands.

In accordance with embodiments, the UE is configured to monitor only the continuous frequency range at least for the duration of the CORESETs.

In accordance with embodiments, the UE comprises a timer, the timer to start at the end of the CORESETs, and the UE is to receive UL grants or DL assignments located within the whole of the one or more neighboring frequency bands after the timer expired.

In accordance with embodiments, one or more or all of the frequency bands are unlicensed subbands, and wherein
 following a successful Listen-Before-Talk, LBT, for one or more unlicensed subbands, a communication is allowed during a certain transmission time, (COT) in an available unlicensed subband.
 following a failed Listen-Before-Talk, LBT, for one or more unlicensed subbands, a communication is not allowed in a non-available unlicensed subband, and the UE is to not perform a communication on the non-available unlicensed subbands.

In accordance with embodiments, the one or more CORESETs carrying control information for the UE are transmitted once or several times during the certain transmission time (COT).

In accordance with embodiments, the UE is to stop or deactivate blind decoding for search spaces or CORESETs in unlicensed subbands in which the LBT failed.

The present invention provides a user device, UE, for a wireless communication system, wherein the UE is to be served by a base station and is to use one or more frequency bands for a communication with one or more entities, e.g., other UE(s) or other gNB(s), in the wireless communication system, wherein one or more or all of the frequency bands include one or more CORESETs carrying control information, e.g. DCI(s), for the UE, and wherein one or more backup CORESETs are provided in one or more of the frequency bands.

In accordance with embodiments, the UE is configured or preconfigured with locations of the one or more backup CORESETs in the one or more frequency bands.

In accordance with embodiments, the UE is to employ a backup CORESET
 responsive to the UE detecting that a base station serving the UE does not transmit in a frequency band, e.g., responsive to an indication by the bases station about an LBT failure or an indication that the bases station does not transmit the CORESET, and/or
 responsive to the UE not being able to decode any valid control information in at least one or all of a plurality of CORESETs linked to the backup CORESET.

In accordance with embodiments, one or more or all of the plurality of frequency bands are unlicensed subbands on which a communication is allowed for a certain transmission time (COT) responsive to a successful Listen-Before-Talk, LBT, and following a failed gNB LBT for a certain unlicensed subband, the UE is to employ within the certain transmission time (COT) one or more backup CORESETs in one or more of the unlicensed subbands where the LBT was successful, e.g., in one or more unlicensed subbands other than a default unlicensed subband.

In accordance with embodiments, the UE is to perform blind decoding for control information, e.g., DCI(s), according to a CORESET or search space prioritization and/or based on an indication which CORESETs are indicated to be transmitted or to include information for the UE.

In accordance with embodiments, the UE is to equally or unequally distribute the number of the blind decoding attempts across the CORESETs and/or search spaces.

In accordance with embodiments, the UE is to skip CORESETs and/or search spaces that are indicated to be not transmitted or not meant for the UE.

In accordance with embodiments, the UE is to increase a number of blind decodes per search space within a search space group based on a formula in response to detecting that other search spaces of the same group are not transmitted or not relevant for the UE.

In accordance with embodiments, the total number of blind decodes per search space group stays the same.

In accordance with embodiments, the UE is to monitor only a subset of the CORESETs carrying control information, e.g., DCI(s), for the UE, e.g., responsive to an RRC configuration or reconfiguration message.

In accordance with embodiments, the subset of CORESETs to monitor is chosen based on detecting actually transmitted CORESETs out of a CORESET group.

In accordance with embodiments, the CORESETs to be monitored are selected so as to achieve a useful distribution of the UEs across two or more of the frequency bands, e.g., to achieve load balancing.

In accordance with embodiments, the UE is to determine the CORESETs to be monitored as a subset of a CORESET group based on a formula indicated by the gNB which incorporates the number of actually transmitted CORESETs.

In accordance with embodiments, the UE is configured with a UE ID and, to determine an index of a CORESET to be monitored out of the actually transmitted CORESETs, the UE is to calculate (UE ID) % (Number of actually transmitted CORESETs), wherein % indicates the modulo operation.

Base Station

The present invention provides a base station, BS, for a wireless communication system, wherein the BS is to serve one or more UEs and is to use one or more frequency bands for a communication with the one or more UEs in the wireless communication system, wherein one or more or all of the frequency bands include one or more CORESETs carrying control information for the one or more UEs, and wherein the BS is to configure, e.g., using RRC signaling, the one or more UEs with one or more group IDs, each group ID pointing to or indicating a group of one or more other CORESETs or one or more search spaces, wherein a CORESET group includes some or all CORESETs within a certain time window, and wherein a search space group includes some or all search spaces within the certain time window.

In accordance with embodiments, the BS is to include into some or all of the CORSETs an indication in which of the CORSETs out of the CORESET group control information for a certain UE is present.

The present invention provides a base station, BS, for a wireless communication system, wherein the BS is to serve one or more UEs and is to use one or more frequency bands for a communication with one or more UEs in the wireless communication system, wherein one or more or all of the frequency bands include one or more CORESETs carrying control information, e.g., DCI(s), for the UE, and wherein the control information of some or all of the CORSETs indicate in which of the CORSETs in one or more other of the frequency bands control information for a receiving UE is present.

The present invention provides a base station, BS, for a wireless communication system, wherein the BS is to serve one or more UEs and is to use a plurality of frequency bands for a communication with the one or more UEs, wherein some, e.g., two or more, or all of the plurality of frequency bands include one or more CORESETs carrying control information, e.g., DCI(s), for the one or more UEs, and wherein the BS is to transmit CORESETs of one or more neighboring frequency bands within a pre-defined continuous frequency range extending both in both neighboring frequency bands.

The present invention provides a base station, BS, for a wireless communication system, wherein the BS is to serve one or more UEs and is to use one or more frequency bands for a communication with the one or more UEs in the wireless communication system, wherein one or more or all of the frequency bands include one or more CORESETs carrying control information, e.g., DCI(s), for the UE, and wherein the BS is to configure the one or more UEs with one or more backup CORESETs in the one or more frequency bands.

The present invention provides a base station, BS, for a wireless communication system, wherein the BS is to serve one or more UEs and is to use a plurality of frequency bands for a communication with the one or more UEs in the wireless communication system, wherein one or more or all of the plurality of frequency bands include one or more CORESETs carrying control information, e.g., DCI(s), for the UE, and wherein some or all of the plurality of frequency bands are unlicensed frequency bands on which a communication is allowed for a certain transmission time (COT) responsive to a successful Listen-Before-Talk, LBT, and wherein, responsive to an unsuccessful or failed LBT on one or more of the unlicensed frequency bands, the BS is to distribute the control information for the one or more UEs among the one or more frequency bands available for the communication, e.g., among one or more frequency bands which passed the LBT.

In accordance with embodiments, the one or more UEs served by the BS are configured with a UE ID and the BS is to indicate out of the actually transmitted CORESETs an index of a CORESET to be monitored by the one or more served UEs, the BS is to calculate (UE ID) % (Number of actually transmitted CORESETs), wherein % indicates the modulo operation.

In accordance with embodiments, the BS is to redistribute the control information, e.g., DCI(s), according to a CORESET or search space prioritization and/or based on an indication which CORESETs are to be transmitted or to include information for a specific UE.

System

The present invention provides a wireless communication system, comprising one or more UEs in accordance with the present invention, and one or more BSs in accordance with the present invention.

In accordance with embodiments, the UE comprises one or more of a mobile terminal, or stationary terminal, or cellular IoT-UE, or vehicular UE, or vehicular group leader (GL) UE, an IoT or narrowband IoT, NB-IoT, device, or a WiFi non Access Point STAtion, non-AP STA, e.g. 802.11ax or 802.11be, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and/or the BS comprises one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g. 802.11ax or 802.11be, or any transmission/reception point, TRP, enabling an item or a device to communicate using the wireless communication network, the item or device being provided with network connectivity to communicate using the wireless communication network.

Method

The present invention provides a method for operating a wireless communication system, wherein a UE is served by a base station and uses one or more frequency bands for a communication with one or more entities, e.g., other UE(s) or other gNB(s) in the wireless communication system, wherein one or more or all of the frequency bands include one or more CORESETs, each CORESET including one or more search spaces carrying control information, e.g., DCI (s), for the UE, and wherein method comprises grouping some or all of the CORESETs into respective CORESET groups, or some or all of the search spaces into respective search space groups, wherein a CORESET group includes some or all CORESETs within a certain time window, and wherein a search space group includes some or all search spaces within the certain time window, and wherein the grouping is responsive to
one or more group IDs the UE is configured with, each group ID pointing to or indicating a CORESET group or a search space group, and/or
determining CORESETs or search spaces to be within the same time window.

The present invention provides a method for operating a wireless communication system, wherein a UE is served by a base station and uses one or more frequency bands for a communication with one or more entities, e.g., other UE(s) or other gNB(s), in the wireless communication system, wherein the one or more or all of the frequency bands include one or more CORESETs carrying control information, e.g., DCI(s), for the UE, and wherein the method comprises indicating in the control information of some or all of the CORSETs in which of the CORSETs control information for the UE is present.

The present invention provides a method for operating a wireless communication system, wherein the UE is served by a base station and uses a plurality of frequency bands for a communication with one or more entities, e.g., other UE(s) or other gNB(s), in the wireless communication system, wherein some, e.g., two or more, or all of the plurality of frequency bands include one or more CORESETs carrying control information, e.g., DCI(s), for the UE, wherein the UE decodes the control information, e.g., DCI(s), from one or more of the CORESETs, and wherein the method comprises locating in one or more neighboring frequency bands one or more of the CORESETs within a pre-defined continuous frequency range extending in both neighboring frequency bands.

The present invention provides a method for operating a wireless communication system, wherein the UE is served by a base station and uses one or more frequency bands for a communication with one or more entities, e.g., other UE(s) or other gNB(s), in the wireless communication system, wherein one or more or all of the frequency bands include one or more CORESETs carrying control information, e.g. DCI(s), for the UE, and wherein the method comprises providing one or more backup CORESETs in one or more of the frequency bands.

The present invention provides a method for operating a wireless communication system, wherein a BS serves one or more UEs and uses a plurality of frequency bands for a communication with the one or more UEs in the wireless communication system, wherein one or more or all of the plurality of frequency bands include one or more CORESETs carrying control information, e.g., DCI(s), for the UE, and wherein some or all of the plurality of frequency bands are unlicensed frequency bands on which a communication is allowed for a certain transmission time (COT) responsive to a successful Listen-Before-Talk, LBT, and wherein the method comprises, responsive to an unsuccessful or failed LBT on one or more of the unlicensed frequency bands, distributing, by the BS, the control information for the one or more UEs among the one or more frequency bands available for the communication, e.g., among one or more frequency bands which passed the LBT.

Computer Program Product

The present invention provides a computer program product comprising instructions which, when the program is executed by a computer, causes the computer to carry out one or more methods in accordance with the present invention.

The present invention provides embodiments for improving or enhancing the energy efficiency of a UE communicating in a wireless communication system using a one or more frequency bands wherein one or more or all of the frequency bands include control information for the UE, and wherein the UE is to scan for the control information in a plurality of control regions, e.g. CORESETs, in the one or more frequency bands.

Figure 3A:
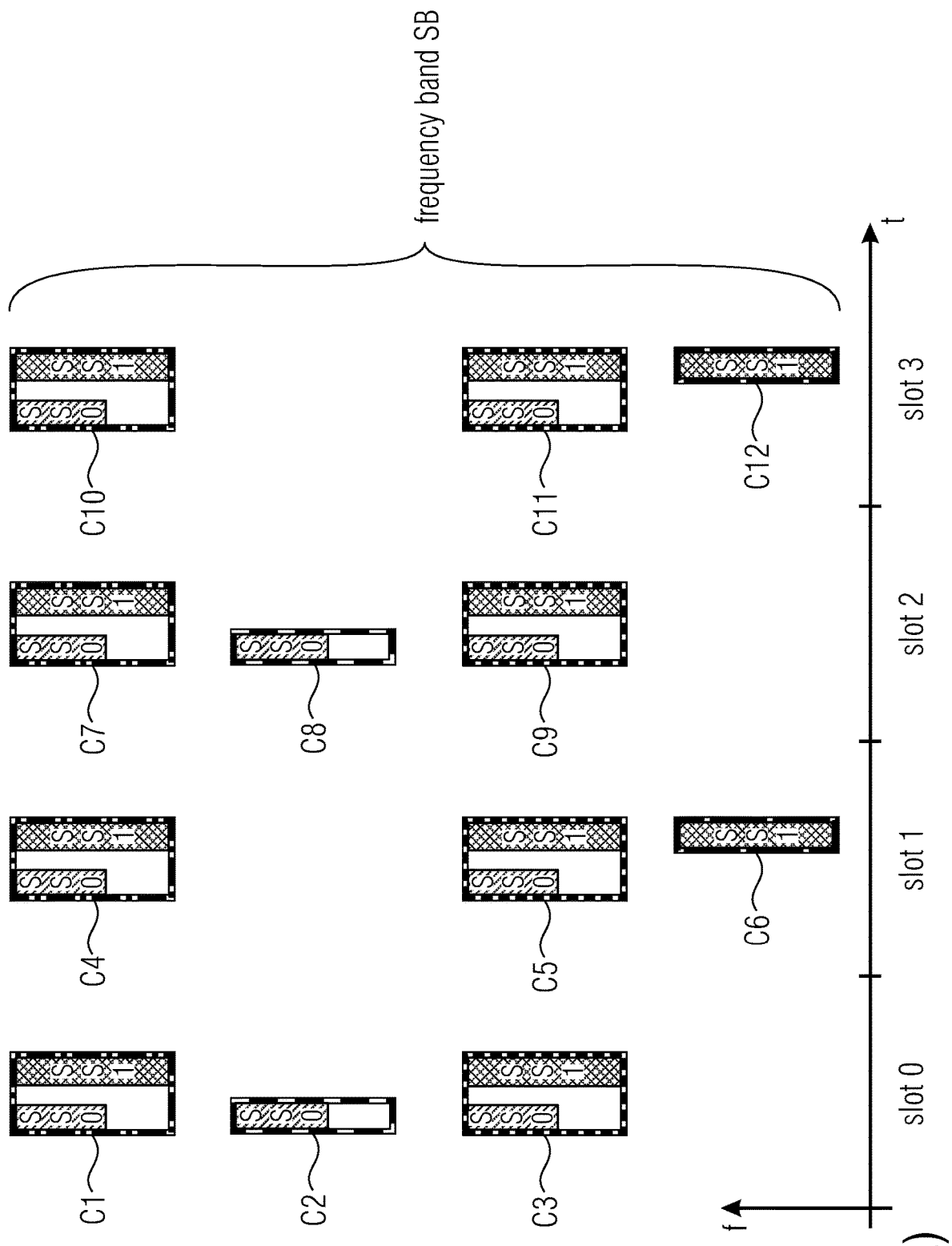
FIG. 3(a) schematically illustrates a single-band transmission including respective control information for the receiving UE.

FIG. 3(a) schematically illustrates a single-band transmission between a base station and a UE, or, in accordance with other embodiments, between two UEs, including respective control information for the receiving UE. The communication over the frequency band SB comprises a plurality of time windows or slots. FIG. 3(a) illustrates four slots of the communication, namely slot 0, slot 1, slot 2 and slot 3. In the depicted embodiment, each of the slots includes control information, for example DCIs, for one or more UEs that are served, for example, by a base station. The control information is provided in respective control resource sets, CORESETs. In the embodiment of FIG. 3(a), in slot 0, three CORESETs C1 to C12 are transmitted. Each of the CORESETs includes the control information for one or more UEs, for example the UEs being within a cell of a base station, i.e., for UEs being served by a base station. In accordance with other embodiments, the different UEs may be one or more UEs with which a transmitting UE performs a communication over a sidelink. The invention is not limited to the specific configuration of control information transmission as indicated in FIG. 3(a), rather a different number of CORESETs may be transmitted in the respective slots.

Figure 3B:
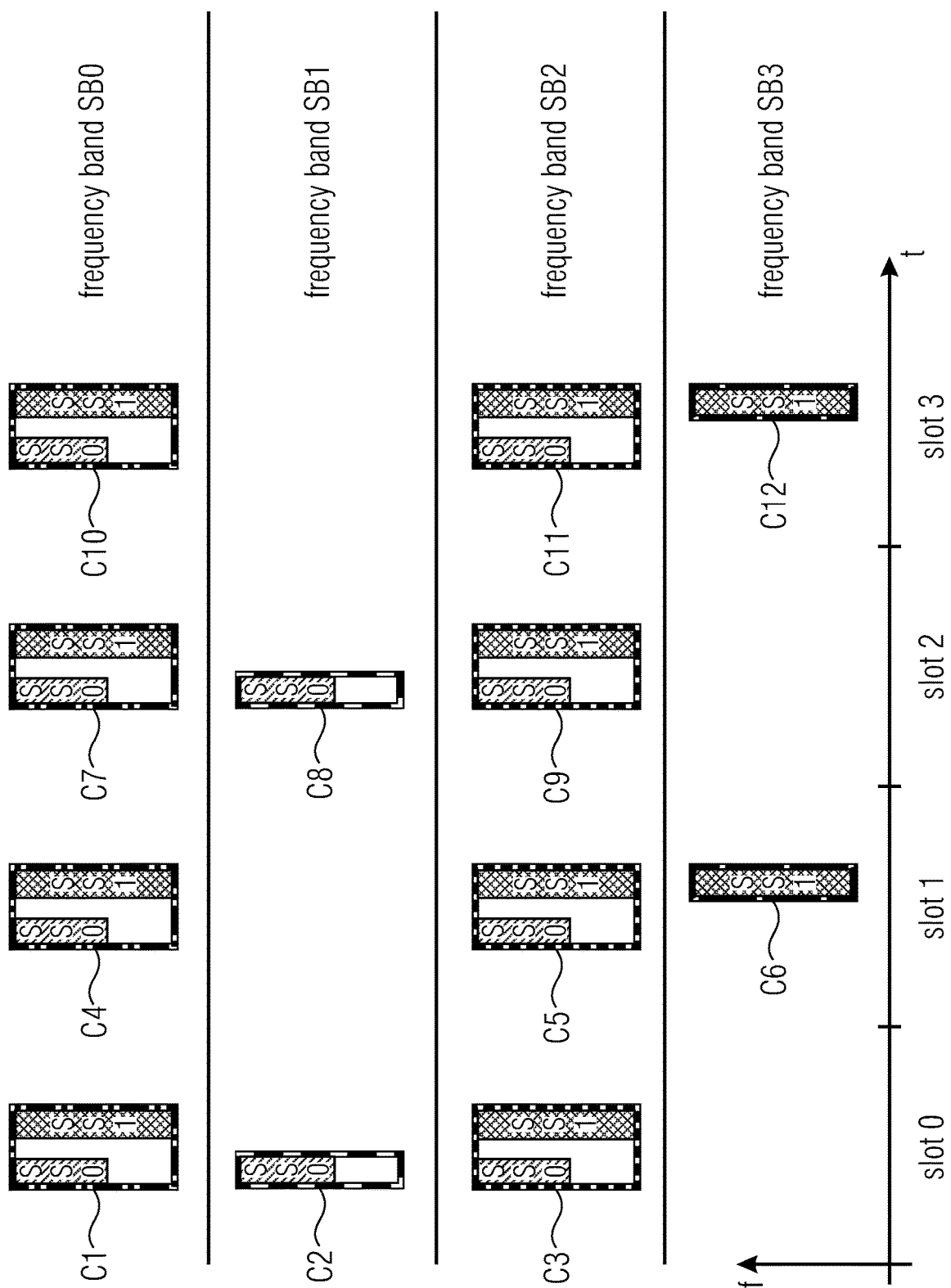
FIG. 3(b) schematically illustrates a multi-band transmission including respective control information for the receiving UE.

FIG. 3(b) schematically illustrates a multi-band transmission between a base station and a UE, or, in accordance with other embodiments, between two UEs, including respective control information for the receiving UE. In the embodiment of FIG. 3(b), a multi-band transmission is assumed, in the licensed spectrum and/or in the unlicensed spectrum, using four immediately consecutive frequency bands, SB0 to SB3. The frequency bands SB0 to SB3 may have the same bandwidths, however, the inventive the inventive approach is not limited to such embodiments, rather, some or more of the frequency bands may have different bandwidths. Also, the inventive approach is not limited to immediately consecutive frequency bands, rather, in accordance with other embodiments, some or all of the frequency bands may be separated in the frequency domain, i.e., may not be immediately adjacent. The communication over the multiple frequency bands comprises a plurality of time windows or slots and FIG. 3(b) illustrates four slots of the communication, namely slot 0, slot 1, slot 2 and slot 3. In the depicted embodiment, each of the slots includes control information, for example DCIs, for one or more UEs that are served, for example, by a base station. The control information is provided in respective control resource sets, CORESETs. In the embodiment of FIG. 3, in slot 0, three CORESETs C1 to C3 are transmitted, one in frequency band SB0, one in frequency band SB1 and one in frequency band SB2. In slot 1, CORESETs C4 to C6 are transmitted in frequency bands SB0, SB2 and SB3. In slots 2 and 3 the CORESETs C7 to C12 are transmitted in the respective frequency bands as indicated.

Each of the CORESETs includes the control information for one or more UEs, for example the UEs being within a cell of a base station, i.e., for UEs being served by a base station. In accordance with other embodiments, the different UEs may be one or more UEs with which a transmitting UE performs a communication over a sidelink. The invention is not limited to the specific configuration of control information transmission as indicated in FIG. 3(b), rather a different number of CORESETs may be transmitted in the respective slots. In case of NR-U the frequency bands are also referred to as subbands.

Each of the CORESETs includes one or more search spaces, SS, in which the actual control information is transmitted. In the embodiments of FIG. 3, some of the CORESETs have two search spaces, SS0, SS1 (see CORESETs C1, C3 to C5, C7, C9 to C11), while others have only a single search space SS0 or SS1 (see CORESETs C2, C3, C6, C8 and C12). Naturally, in accordance with other embodiments, more than two search spaces may be provided within a CORESET. A UE receiving a communication from a transmitter, like a base station or another UE, including the plurality of bands as indicated in FIG. 3 performs blind decoding in the respective CORESETs so as to find search spaces carrying control information for this specific UE. The search spaces are the possible locations for the control information for the UE, and each of the possible locations is also referred to as a PDCCH candidate.

As indicated above, blind decoding over all of the CORESETs may not be efficient in terms of energy efficiency and the like, so that in accordance with embodiments of the present invention the UE may perform a CORESET or search space grouping, for example on the basis of configurations being consistent for different CORESETs in the one frequency band or across different frequency bands.

In accordance with embodiments, the grouping may be referred to as an explicit grouping, which includes a group ID that is received by the UE, for example from the transmitter, like the base station or the transmitting UE in a sidelink communication, and which indicates one or more CORESETs or search spaces that form a CORESET group or a search space group. In accordance with other embodiments, the grouping may be performed at the UE without further information or signaling from the transmitter, which is also referred to as an implicit grouping. For an implicit grouping the UE determines CORESETs or search groups having a consistent configuration in the one or more frequency bands and groups them into a group. In either case, CORESETs or search spaces that share a common time window, for example, CORESETs or search spaces that share the same slot or a certain duration within a slot or that share a number of consecutive symbols within a slot or the like are considered to form a group. The number of consecutive symbols may include a plurality of immediately consecutive symbols or consecutive symbols separated, e.g., by one or more reference symbols.

Figure 4A:
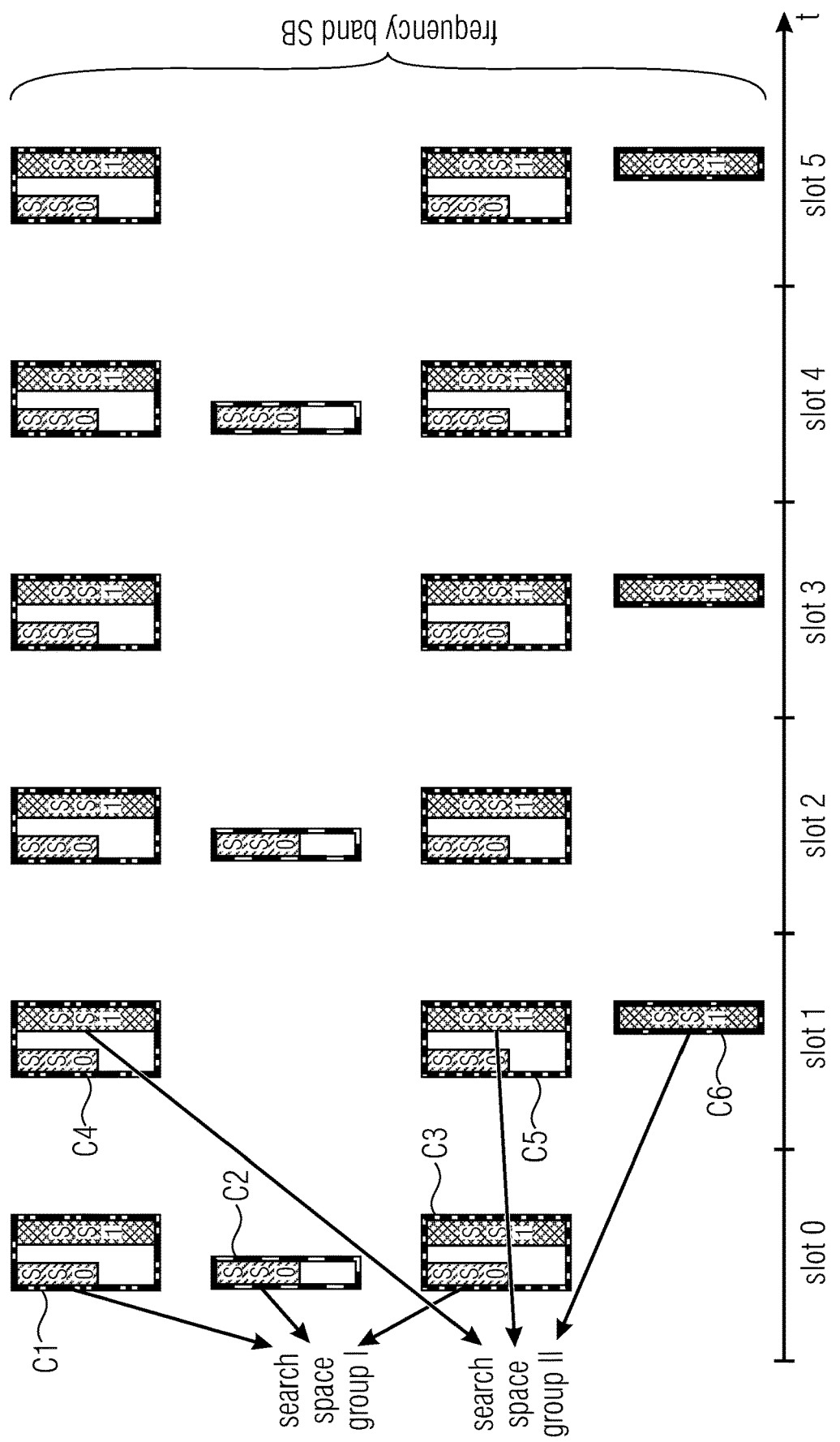

FIG. 4 illustrates an embodiment in accordance with which search space grouping is applied. FIG. 4(a) illustrates a single-band communication similar as in FIG. 3(a). In accordance with this embodiment, search spaces of respective CORESETs which are within a predefined time window, which, in the example of FIG. 4(a) span a number of predefined consecutive symbols, are grouped together. FIG. 4(b) illustrates a multi-band communication similar as in FIG. 3(b). In accordance with this embodiment, search spaces of respective CORESETs which are within a predefined time window, which, in the example of FIG. 4 span a number of predefined consecutive symbols, are grouped together. As is depicted in FIG. 4(a) and FIG. 4(b), in slot 0, the respective search spaces SS0 of the CORESETs C1, C2 and C3 are within a common or overlapping time window and are grouped together into search space group I. In slot 1, the search spaces SS1 of the respective CORESETs C4, C5 and C6 which are provided within an at least overlapping time window, in the example again using the same consecutive symbols within slot 1, are grouped together into the search space group II.

The grouping may be signaled to the UE explicitly, for example, by the transmitter, like the gNB or another UE transmitting information towards the UE. More specifically, the search groups may have assigned a certain group index or group identification, and the UE may be configured by the transmitter, for example using an RRC signaling as indicated below, with the respective group IDs indicating those search spaces in the respective CORESETs which belong to a common group. Below, an example of an RRC message with the CORESET group configuration in the SearchSpace config is shown

```
-- ASN1START
-- TAG-SEARCHSPACE-START
SearchSpace ::=                    SEQUENCE {
   searchSpaceId                      SearchSpaceId,
   controlResourceSetId               ControlResourceSetId   OPTIONAL, -- Cond SetupOnly
   controlResouceSetGroup             SEQUENCE{
      groupIndex                         GroupId, INTEGER/BIT STRING/ENUMERATED{...}
      controlResourceId(s)               ControlResourceseId(s)
   }
   monitoringSlotPeriodicityAndOffset    CHOICE {
      sl1                                NULL,
      sl2                                INTEGER (0..1),
      sl4                                INTEGER (0..3),
      sl5                                INTEGER (0..4),
      sl8                                INTEGER (0..7),
      sl10                               INTEGER (0..9),
      sl16                               INTEGER (0..15),
      sl20                               INTEGER (0..19),
      sl40                               INTEGER (0..39),
      sl80                               INTEGER (0..79),
      sl160                              INTEGER (0..159),
      sl320                              INTEGER (0..319),
```

|  |  |
|---|---|
| s1640 | INTEGER (0..639), |
| s11280 | INTEGER (0..1279), |
| s12560 | INTEGER (0..2559) |

The above RRC message may be an existing Release 15 search space configuration (TS 38.311) further including a CORESET group configuration. The CORESET group configuration includes a group index and optionally the corresponding CORESET ID(s), which are part of this group.

In accordance with other embodiments of the explicit signaling of the search space groups, the following RRC configuration element may be employed, which, other than the previously described one, only includes the group ID.

```
-- ASN1START
-- TAG-SEARCHSPACE-START
SearchSpace ::=          SEQUENCE {
    searchSpaceId        SearchSpaceId,
    controlResourceSetId ControlResourceSetId    OPTIONAL, -- Cond SetupOnly
    groupIndex           GroupId, INTEGER/BIT STRING/ENUMERATED {...}
monitoringSlotPeriodicityAndOffset               CHOICE {
    sl1                      NULL,
    sl2                      INTEGER (0..1),
    sl4                      INTEGER (0..3),
    sl5                      INTEGER (0..4),
    sl8                      INTEGER (0..7),
    sl10                     INTEGER (0..9),
    sl16                     INTEGER (0..15),
    sl20                     INTEGER (0..19),
    sl40                     INTEGER (0..39),
    sl80                     INTEGER (0..79),
    sl160                    INTEGER (0..159),
    sl320                    INTEGER (0..319),
    sl640                    INTEGER (0..639),
    sl1280                   INTEGER (0..1279),
    sl2560                   INTEGER (0..2559)
}                                                OPTIONAL, -- Cond SetupOnly
    duration             INTEGER (2..2559)       OPTIONAL, -- Need R
```

The above RRC message may be an existing Release 15 search space configuration (TS 38.311) further including a group index.

In both cases mentioned above, the grouping of the search spaces as shown in FIG. 4 is signaled explicitly and the search space group includes search spaces being provided within a common time window. In accordance with further embodiments, the search spaces may be grouped further on the basis of the monitoring periodicity, the symbols to be monitored within a slot and other values described in the respective fields of the search space IE.

In accordance with other embodiments, the grouping may be done implicitly by the UE using information from the configurations of the search spaces. For example, the UE may recognize from the received configuration information those search spaces which have an overlapping or the same time window. For example, search spaces that span, at least partially, the same number of OFDM symbols in a certain slot are considered by the UE to belong to a common group in a certain slot as indicated in FIG. 4.

In accordance with other embodiments of the inventive approach, as mentioned above, instead of or in addition to providing search space groups, CORESET groups may be provided. FIG. 5 illustrates schematically the inventive approach of a CORESET grouping.

Figure 5B:
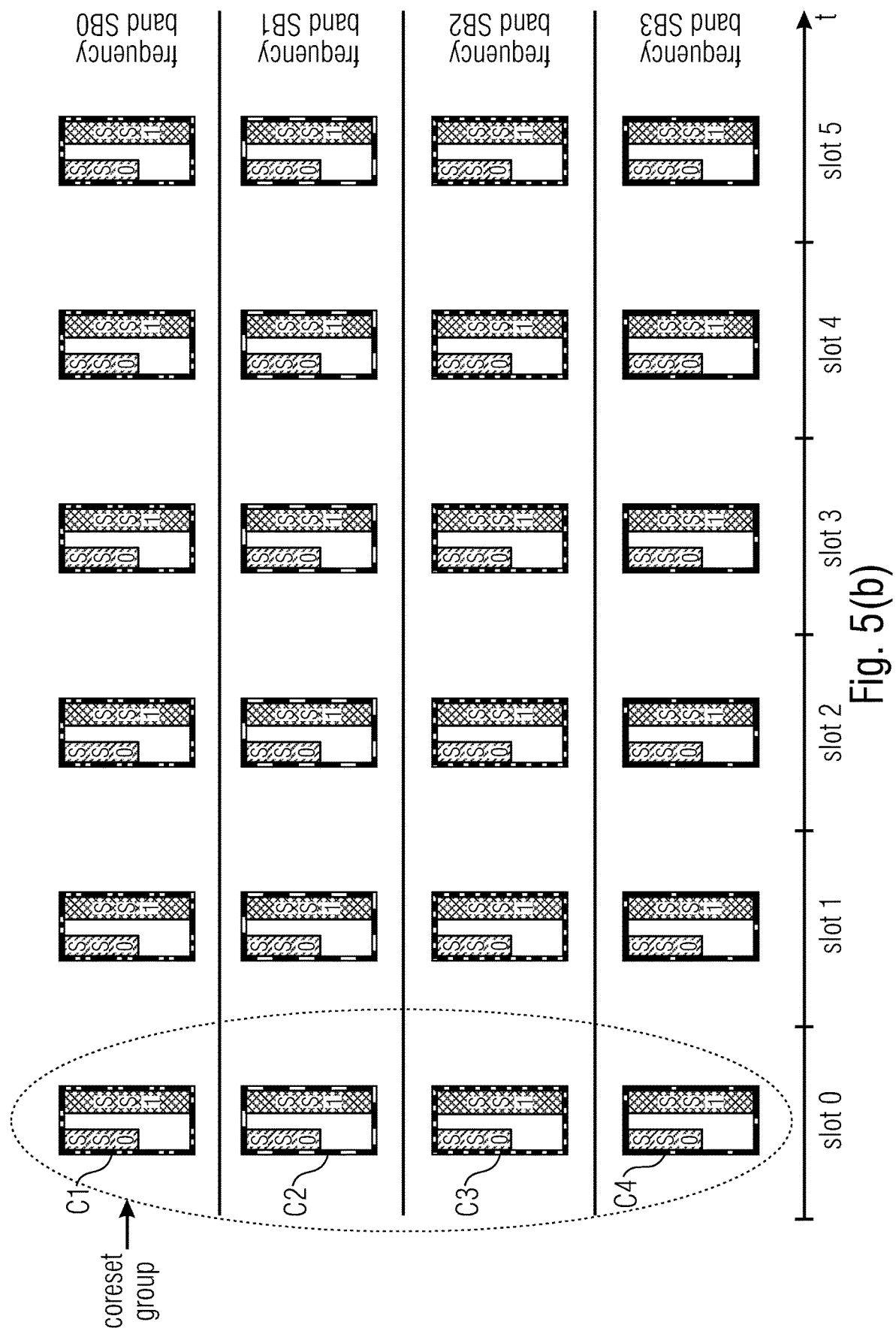
FIG. 5(b) illustrates a multi-band communication similar as in v FIG. 3(b)

In a similar way as in FIG. 4, FIG. 5(a) illustrates a communication including a single frequency band SB using respective slots 0 to 5 for a transmission from a transmitter, like gNB or a UE, to a receiving UE. FIG. 5(b) illustrates a communication including a plurality of frequency bands SB0 to SB3, e.g., subbands in case of NR-U, using respective slots 0 to 5 for a transmission from a transmitter, like gNB or a UE, to a receiving UE. In the respective slots the CORESETs carrying the respective control information in the associated search spaces are indicated. In accordance with this embodiment, CORESETs being within a certain time window, for example, being located in the same slot or being located within a slot at overlapping times, for example using overlapping OFDM symbols, are grouped into a CORESET group. FIG. 5 illustrates schematically CORESETs C1 to C4 in slot 0 which form the CORESET group I. Also, one or more of the CORESETs in the other slots may define respective CORESET groups. The CORESET grouping may be done explicitly or implicitly.

In case of an explicit CORESET grouping, the UE may receive from the transmitter a configuration indicating, in addition to the respective fields needed for defining the CORESETs, also a group index indicating those CORESETs forming a certain CORESET group. In accordance with embodiments, the explicit CORESET group signaling may include a CORESET group index information element in an RRC message, for example in the part of an existing Release-15 CORESET configuration as depicted below.

```
-- ASN1START
-- TAG-CONTROLRESOURCESET-START
ControlResourceSet ::=          SEQUENCE {
    controlResourceSetId            ControlResourceSetId,
    groupIndex                      GroupId, INTEGER/BIT STRING/ENUMERATED{...},
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-Bundlesize                  ENUMERATED {n2, n3, n6},
            interleaverSize                 ENUMERATED {n2, n3, n6},
            shiftIndex                      INTEGER (0..maxNrofPhysicalResourceBlocks-1)
OPTIONAL -- Need S
        },
        nonInterleaved                  NULL
    },
    precoderGranularity             ENUMERATED (sameAsREG-bundle, allCantiguousRBs),
    tci-StatesPDCCH-ToAddList       SEQUENCE (SIZE (1..maxNrofTCI-StatesPDCCH)) OF TCI-StateId
OPTIONAL, -- Cond NotSIB1-initialBWP
    tci-StatesPDCCH-ToReleaseList   SEQUENCE (SIZE (1..maxNrofTCI-StatesPDCCH)) OF TCI-StateId
OPTIONAL, -- Cond NotSIB1-initialBWP
    tci-PresentInDCI                ENUMERATED {enabled}
OPTIONAL, -- Need S
    pdcch-DMRS-ScramblingID         INTEGER (0..65535)
OPTIONAL, -- Need S
    ...
}
-- TAG-CONTROLRESOURCESET-STOP
-- ASN1STOP
```

In case of an implicit grouping, rather than receiving an explicit group ID, the receiving UE determines from the received configuration information those CORESETs that share the certain time window and associates some or all of the CORESETs determined with a common group.

Figure 6:
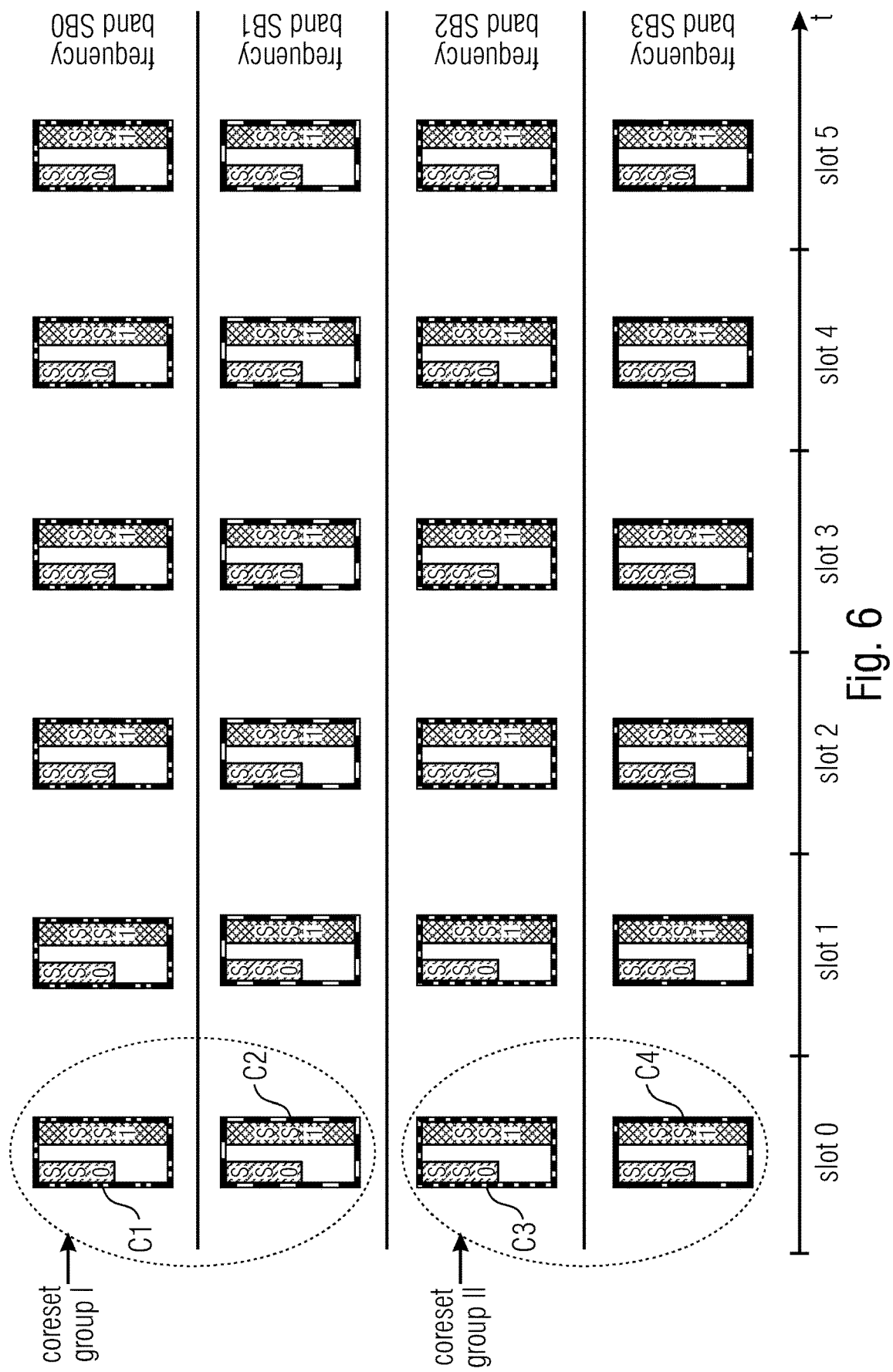
FIG. 6 illustrates, with respect to the CORESET grouping an embodiment in accordance with which CORESETs being within a certain time window are further separated into different groups.

It is noted that the inventive approach is not limited to grouping all CORESETs or all search space within a certain slot and fulfilling the requirement of being within a certain predetermined time window into a common group. Rather, CORESETs or search spaces, which fulfill the requirement for grouping may be further grouped into further groups dependent on additional parameters. For example, search spaces being within a certain time window may further be grouped dependent on their monitoring periodicity, symbols to be monitored within a slot and the like. Also, CORESETs may be grouped dependent on further parameters like CORESET instances lying in the same time window, like a slot, or the monitoring periodicities and offsets of their search space configurations or the subband the CORESETs are assigned to. FIG. 6 illustrates, with respect to the CORESET grouping in an NR-U system, an embodiment in accordance with which CORESETs fulfilling the requirement of being within a certain time window are further separated into different groups dependent on one or more of the above mentioned further parameters. As is illustrated in FIG. 6, the CORESETs C1 to C4 that are provided in slot 0 and which are considered to be within a certain time window are further separated into CORESET groups I and II including CORESETs C1, C2 and C3, C4, respectively. The embodiment of FIG. 6 is equally applicable for a single-band operation or for a multi-band operation in the licensed spectrum.

Figure 7:
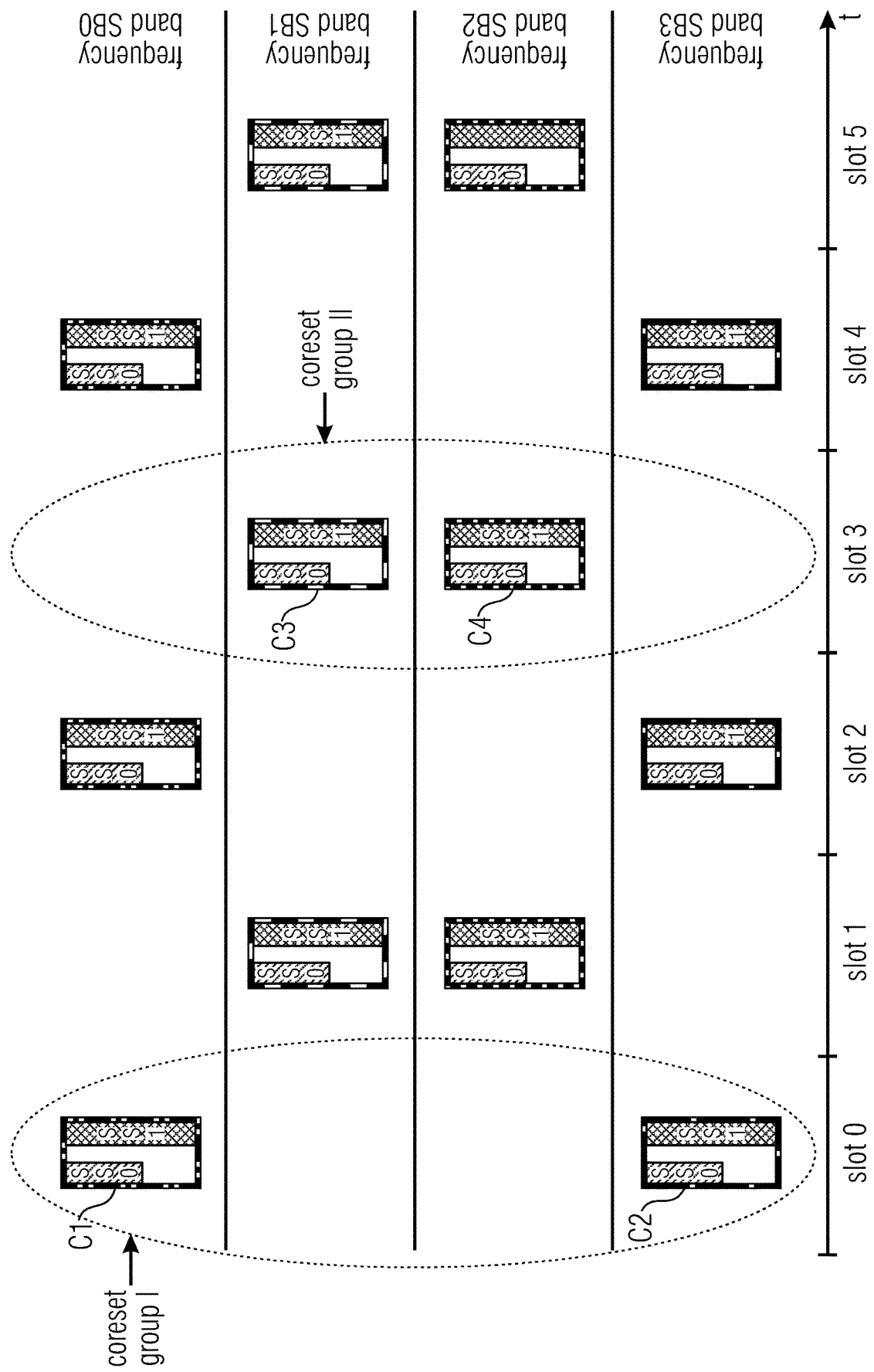
FIG. 7 illustrates embodiments of the grouping of CORESETs with different search space configurations.

With regard to the CORESET grouping, it is noted that the present invention is not limited to the grouping of CORESETs having a structure as illustrated in FIG. 4, namely to CORESETs having the same search space configurations. In accordance with further embodiments, the CORESET grouping may group CORESETs with different search space configurations, as is illustrated in FIG. 7 showing, in a similar way as in FIG. 3(b), multi-band communication between a transmitter and a receiving UE in which the CORESETs C1 and C2 in slot 0 having a first search space configuration are grouped into CORESET group I, while CORESETs C3 and C4 having a different search space configuration in slot 3 for CORESET group II. The embodiment of FIG. 7 is equally applicable for a single-band operation or for a multi-band operation in the licensed spectrum.

Figure 8:
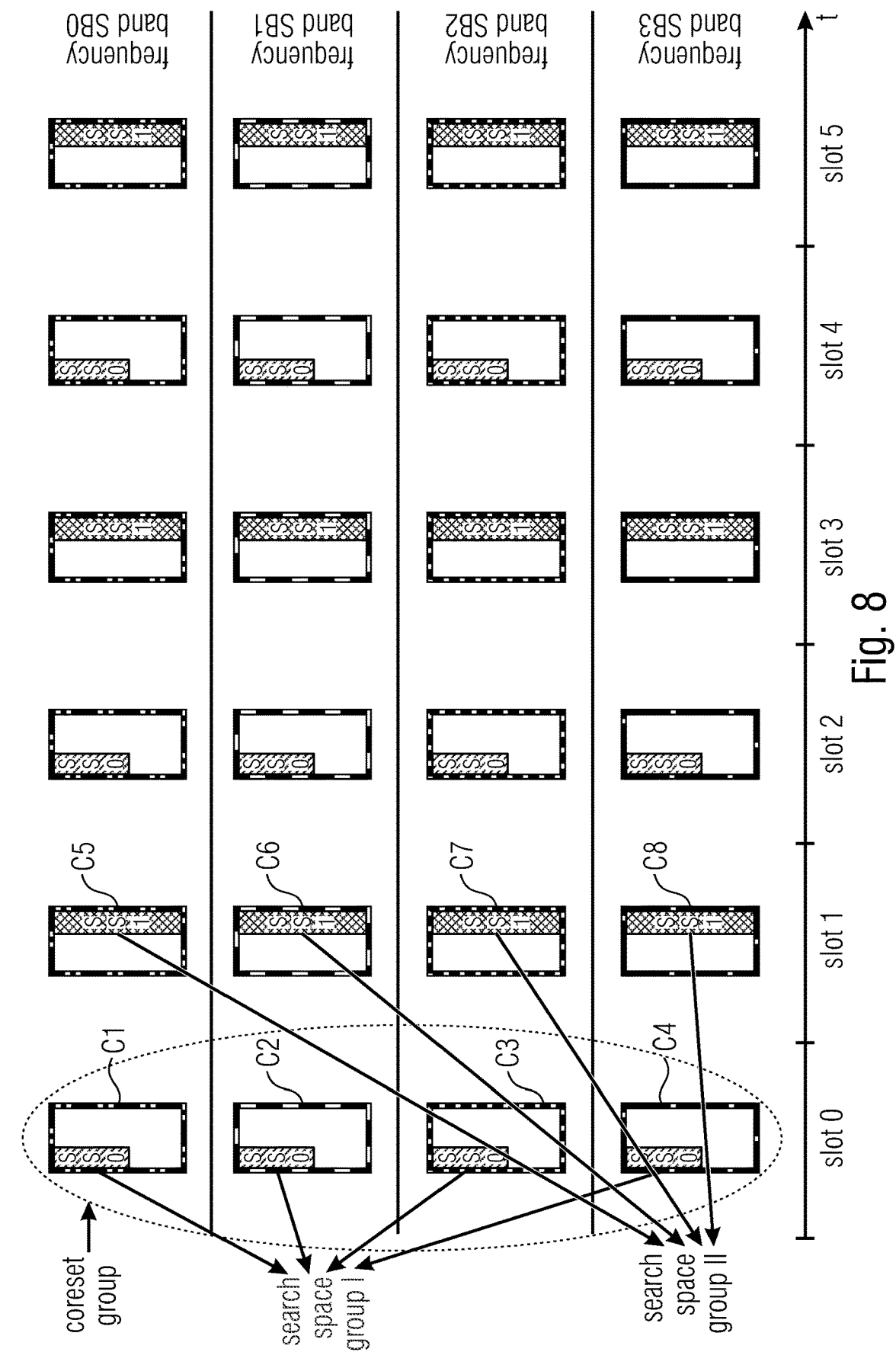
FIG. 8 illustrates an embodiment combining CORESET grouping and search space grouping.

Further, it is noted that the inventive approach is not limited to performing CORESET grouping or search space grouping, rather, in accordance with further embodiments, CORESET grouping may be combined with the flexibility of the search space grouping. FIG. 8 illustrates an embodiment combining CORESET grouping and search space grouping. In a similar way as in FIG. 5(b), the CORESETs C1 to C4 in slot 0 form a CORESET group I, and in addition, the search spaces SS0 of the CORESETs C1 to C4 in the CORESET group I form a first search space group I, while the search spaces SS1 in CORESETs C5 to C8 in slot 1 form a second search space group II. The embodiment of FIG. 8 is equally applicable for a single-band operation or for a multi-band operation in the licensed spectrum.

As described above, in accordance with embodiments for the search space and CORESET grouping, the grouping is based on a location of the respective CORESETs or search spaces within a certain time window. Two or more of the CORESETs or search spaces may be grouped into common groups in case they fall into a common time window. The grouping may be based on the just mentioned similar configurations in the search space or CORESET RRC configurations, respectively. Further, the grouping may be useful not for all communications but only for certain types of communications that need to fulfill certain requirements. Especially, when a large number of CORESETs is to be configured to support reliable communication, e.g. for operation in unlicensed bands or multi TRP or URLLC where an ultra-low latency has to be achieved, the CORESET or search space grouping allows to reduce the blind decoding effort of the UE significantly without sacrificing latency and reliability.

Figure 9:
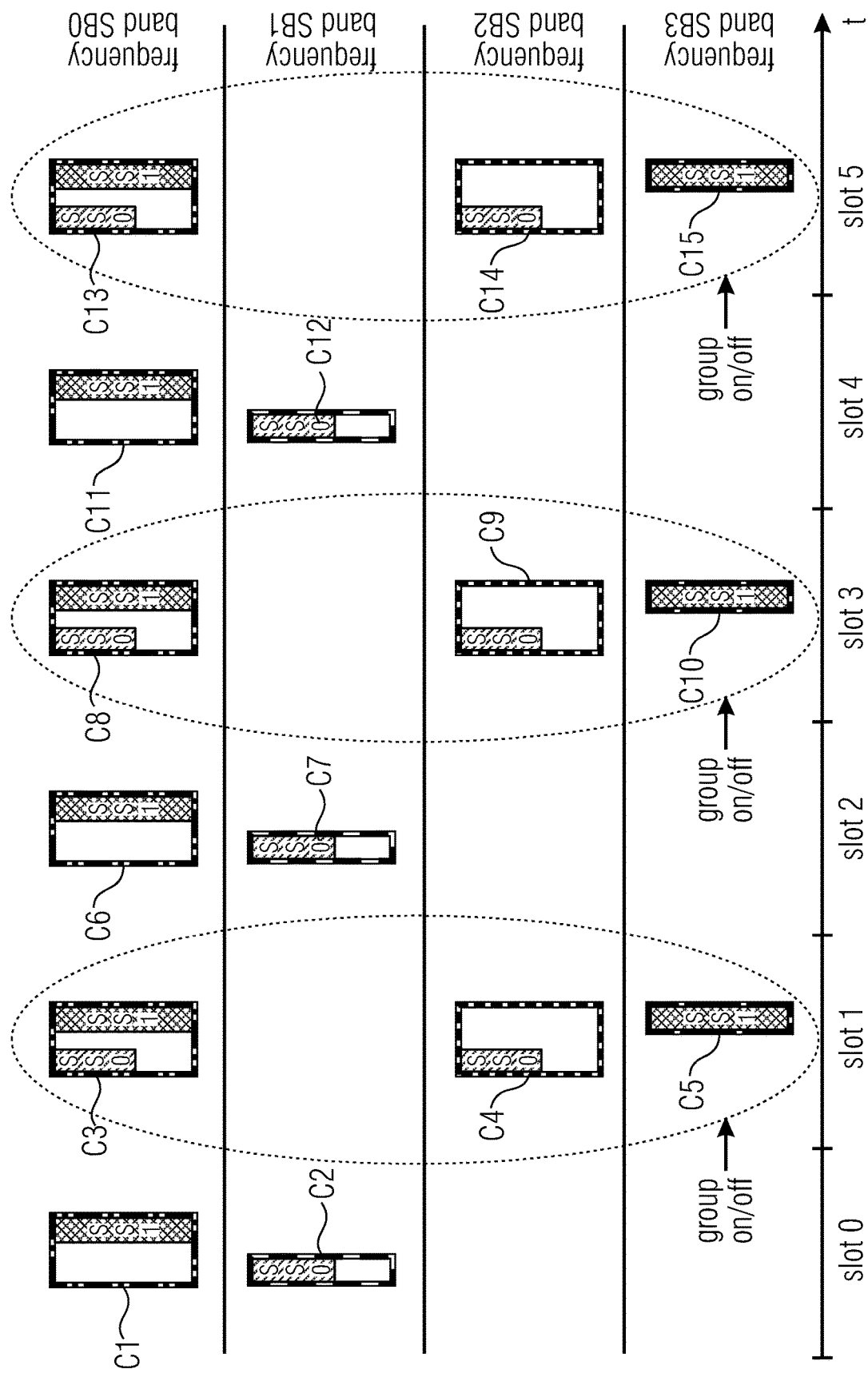
FIG. 9 illustrates an embodiment of a group on/off approach allowing the grouping to be enabled or disabled.

Therefore, in accordance with further embodiments, a group on/off approach is provided so as to allow the grouping to be enabled or disabled dependent on, e.g., certain requirements to be fulfilled for a communication. In other words, the configuration provided to the UE may include an indication or parameter that the grouping is to be activated or deactivated, for example by providing a grouping field being set to true or false. In case the grouping is indicated to be non-activated for one or more CORESETs, such CORESETs may not be part of a group, i.e., the grouping process, either the explicit one or the implicit one, does not consider CORESETs or search spaces for which the grouping is disabled. On the other hand, CORESETs or search spaces provided with a group ID or for which a grouping is to be determined implicitly by the UE and for which the grouping is enabled, the UE may group such CORESETs or search spaces into one or more respective groups. FIG. 9 illustrates schematically this embodiment with reference to the CORESET grouping. In the embodiment depicted in FIG. 9, it is assumed that among the configurations for the respective CORESETs provided to a UE from a transmitter, some configurations include an indication as to the grouping, i.e., whether it is active or non-active, and such configurations may be employed for forming respective groups, in case the grouping indication is activated. In the example of FIG. 9, it is assumed that the CORESET configuration for CORESETs C1 and C2 in slot 0 or the respective search space configurations associated with CORESETs C1 and C2 are not provided with a grouping indication so that the UE does not consider these CORESETs or the respective associated search spaces thereof as candidates for forming a group. On the other hand, the CORESETs C3 to C5 in slot 1 are assumed to have a CORESET configuration or a search space configuration including the grouping indication so that, in case the grouping indication is set to on or true, the UE, either implicitly or explicitly, may group the CORESETs C3 to C5 into a group or the respective search spaces SS0, SS1 into the different search space groups. The CORESETs C7, C8, C12, and C13 in slots 2 and 4, respectively, are assumed to a have a similar configuration with regard to the grouping as the CORESETs C1 and C2 in slot 0. The CORESETs C9 to C11 and C14 to C16 in slots 3 and 5, respectively, are assumed to have a similar configuration with regard to the grouping as the CORESETs C3 to C5 in slot 1, i.e., the respective CORESETs C9 to C11 and C14 to C16 may be grouped into respective CORESETs if the grouping is activated, or the corresponding search spaces SS0, SS1 may be grouped into respective search space groups. The embodiment of FIG. 9 is equally applicable for a single-band operation or for a multi-band operation in the licensed and/or unlicensed spectrum.

Figure 10:
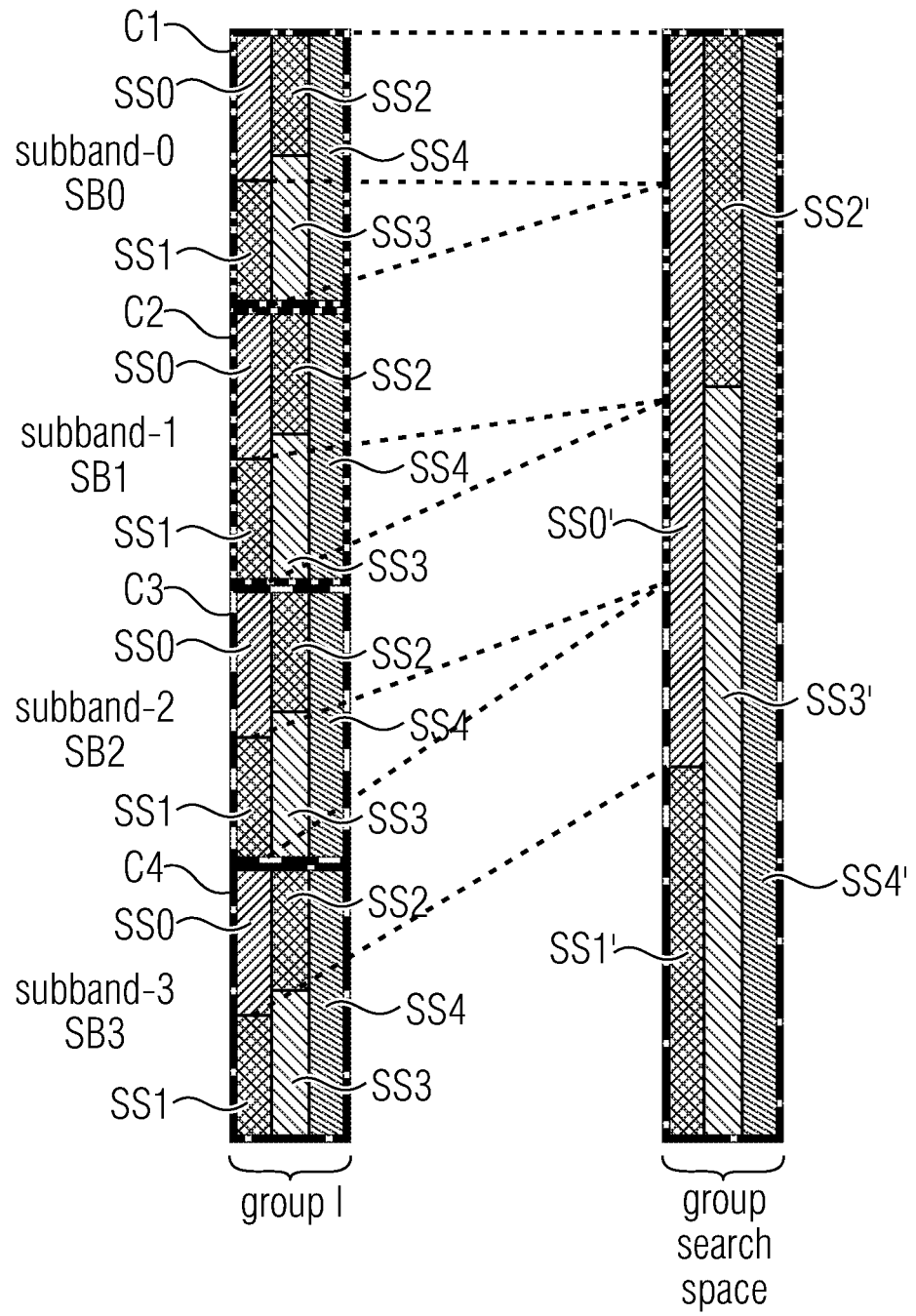
FIG. 10 illustrates an embodiment in which a UE creates a virtual or group search space.

In accordance with embodiments, the grouping of for the respective CORESETs may allow the UE to coordinate the decoding of the control information for the UE from the configured CORESETs. The UE may create a virtual search space by combining or concatenating search spaces of the CORESETs of a CORESET group. FIG. 10 schematically illustrates an embodiment in which the UE creates a virtual search space, also referred to as a group search space. FIG. 10 illustrates the signaling of control information locations for a specific UE assuming an NR-U transmission using three subbands SB0 to SB3. The subbands include the CORESETs C1 to C4 which form a CORESET group. The CORESETs include the respective search spaces SS0 to SS4 that are illustrated by the differently shaded rectangular portions of the CORESETs C1 to C4. As is depicted in the right hand part of FIG. 10, by combining or concatenating the respective search spaces SS0 to SS4 of the CORESETs C1 to C4 a group search space is defined including the search space SS0' formed by concatenating search spaces SS0 from CORESETs C1 to C4, the search space SS1' formed by concatenating search spaces SS1 from CORESETs C1 to C4, the search space SS2' formed by concatenating search spaces SS2 from CORESETs C1 to C4, the search space SS3' formed by concatenating search spaces SS3 from CORESETs C1 to C4, and the search space SS4' formed by concatenating search spaces SS4 from CORESETs C1 to C4. Furthermore, the CORESETs of a CORESET group lying in the same time window like a slot may form a group CORESET. The embodiment of FIG. 10 is equally applicable for a single-band operation or for a multi-band operation in the licensed spectrum.

In accordance with further embodiments, providing the group search space may be advantageous because the UE may not expect more than one or more particular control parameters (e.g., one DL assignment per serving cell, one UL grant per serving cell) within a virtual search space or a virtual CORESET, also referred to as a group search space or as a group CORESET. Thus, the UE may stop blind decoding after successfully decoding one or more DCIs. For example, the UE may expect to receive only a certain number of control parameters, like a single DL assignment, per serving cell, so that once it finds the DL assignment for the specific serving cell it may stop the blind decoding for that specific DCI format, i.e., all remaining search spaces of the group search space or the group CORESET are not searched any further. In other words, in accordance with embodiments, once the UE successfully decoded one PDCCH in a CORESET of one subband, in case a plurality of subbands are used, the UE stops or deactivates the blind decoding. In accordance with embodiments, to reduce the blind decoding, BD, effort, the UE may stick, i.e., continue to blind decode only within a frequency domain monitoring location, i.e. a CORESET confined within a subband, responsive to successfully detecting a PDCCH for a search space associated with the successfully found PDCCH or a predefined or pre-configured subset or all of the search spaces associated with a CORESET group or a search space group, e.g., in one of the frequency locations for a certain time window, e.g. a COT duration or an uninterrupted DL burst. This reduces the amount of BD effort after a PDCCH has been found, because only for the initial PDCCH monitoring occasion the UE has to perform an increased BD effort. In accordance with embodiments, this may be reduced or minimized if the UE starts with a certain search space configuration first and performs the associated BDs across the frequency domain monitoring locations, i.e. the multiple CORESETs each confined within a LBT subband. In this case, the gNB may schedule a PDCCH for the corresponding UE in this search space, such that the UE detects which frequency domain monitoring location to use.

Figures 11A, 11B:
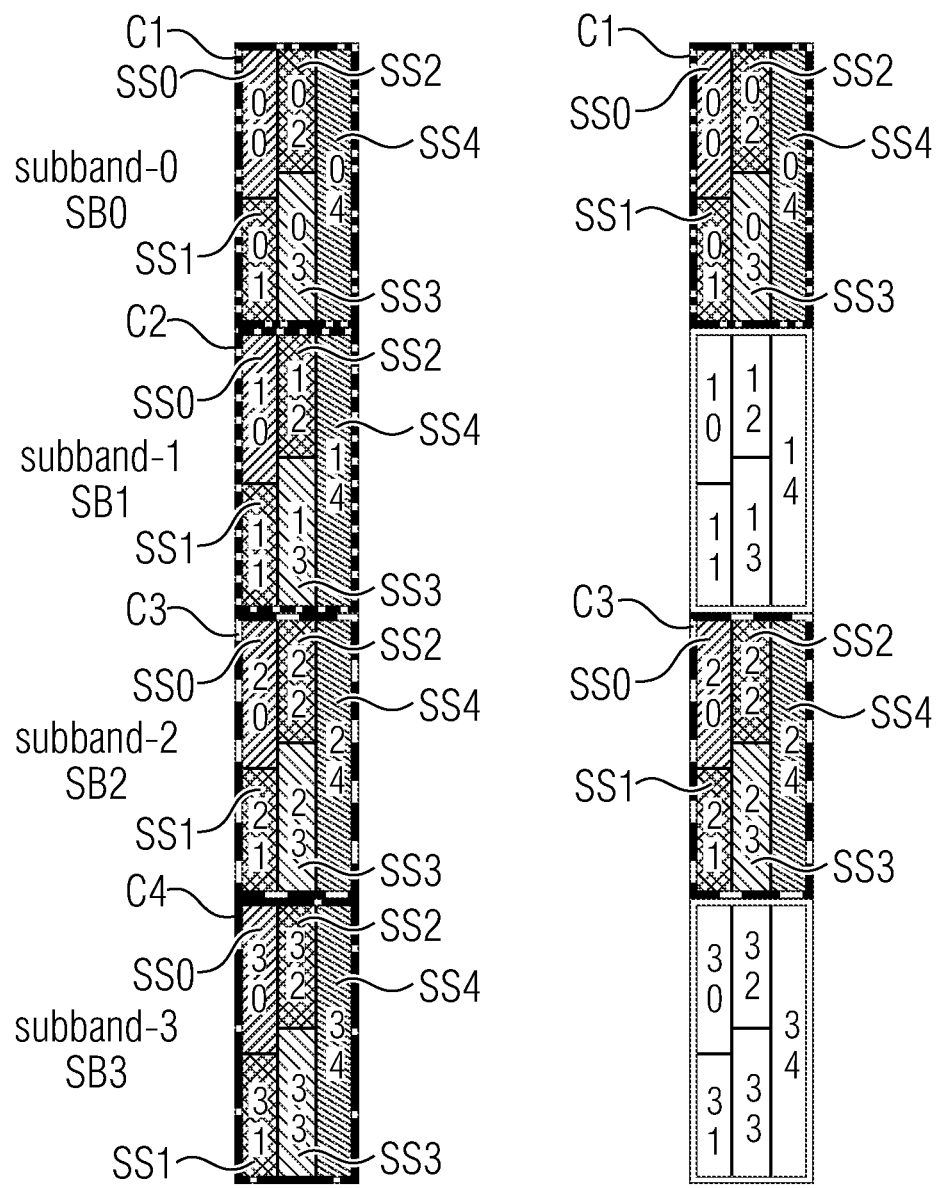
FIGS. 11(a)-11(b) illustrates embodiments restricting a blind decoding to CORESETs having a certain configuration.

In accordance with other embodiments, further blind decoding may be restricted to a certain configuration, like a specific aggregation level, in the search spaces or CORESETs of a search space group or a CORESET group. FIG. 11 illustrates an embodiment in which FIG. 11(a) shows a configuration of the CORESETs as explained above with reference to FIG. 10. FIG. 11 assumes a wideband operation, either in the licensed spectrum, in the unlicensed spectrum or in the licensed/unlicensed spectrum. For example, each of the search spaces SS0 to SS4 in the CORESETS C1 to C4 of a group may be associated with a number of PDCCH candidates for respective aggregation levels, AL. The aggregation level is a property of the PDCCH. A CORESET may include PDCCHs with different ALs.

The search space configuration tells the UE to look for how many PDCCH candidates with a certain AL, e.g. SS1: (AL-1: 0,AL-2: 4, AL-4: 2). In this case the UE looks for this SS for 0 AL-1s, 4 AL-2s and 2AL-4s. In case of applying CORESET grouping or search space grouping, and in case the UE finds successfully a PDCCH with a certain aggregation level, AL, the UE does not expect control information for itself in the CORESETs of the group with another AL. In other words, the UE continues to looks only for this AL in the same and the other CORESETs of the same group at least for this specific DCI format. The embodiment of FIG. 11 is equally applicable for a single-band operation.

This embodiment is, however, not limited to CORESET grouping, rather it may also be employed when applying search space grouping. In this case, if the UE successfully finds a PDCCH in a search space, the UE does not expect control information for itself in a search space with another AL. In other words, the UE continues to look only for the same AL in this and the other search spaces which are associated to the same group.

In case of using unlicensed bands, FIG. 11(a) illustrates that the LBT procedure was successful for each subband being in the unlicensed spectrum. In the scenario of FIG. 11(a), if the UE successfully decodes the PDCCH in SS3 in subband SB0, the UE only decodes the PDCCH at the corresponding locations or search spaces SS1 in the other subbands. Thereby, the search space is reduced and, in turn, the number of blind decoding attempts thereby reducing power consumption and increasing energy efficiency at the UE. In the In case of using unlicensed bands, FIG. 11(b) illustrates the LBT procedure was only successful for subband SB0 and subband SB2, but was not successful for subband SB1 and SB3. Thus, in the situation depicted in FIG. 11(b), only CORESETs C1 and C3 in subbands SB0 and SB2 are transmitted. In case the UE successfully decodes the PDCCH in SS3 in subband SB0 at the CORESET C01, due to the fact that subbands SB1 and SB3 are not carrying information, only the corresponding location or search space SS3 in subband SB2 in CORESET C21 is decoded.

Figure 12:
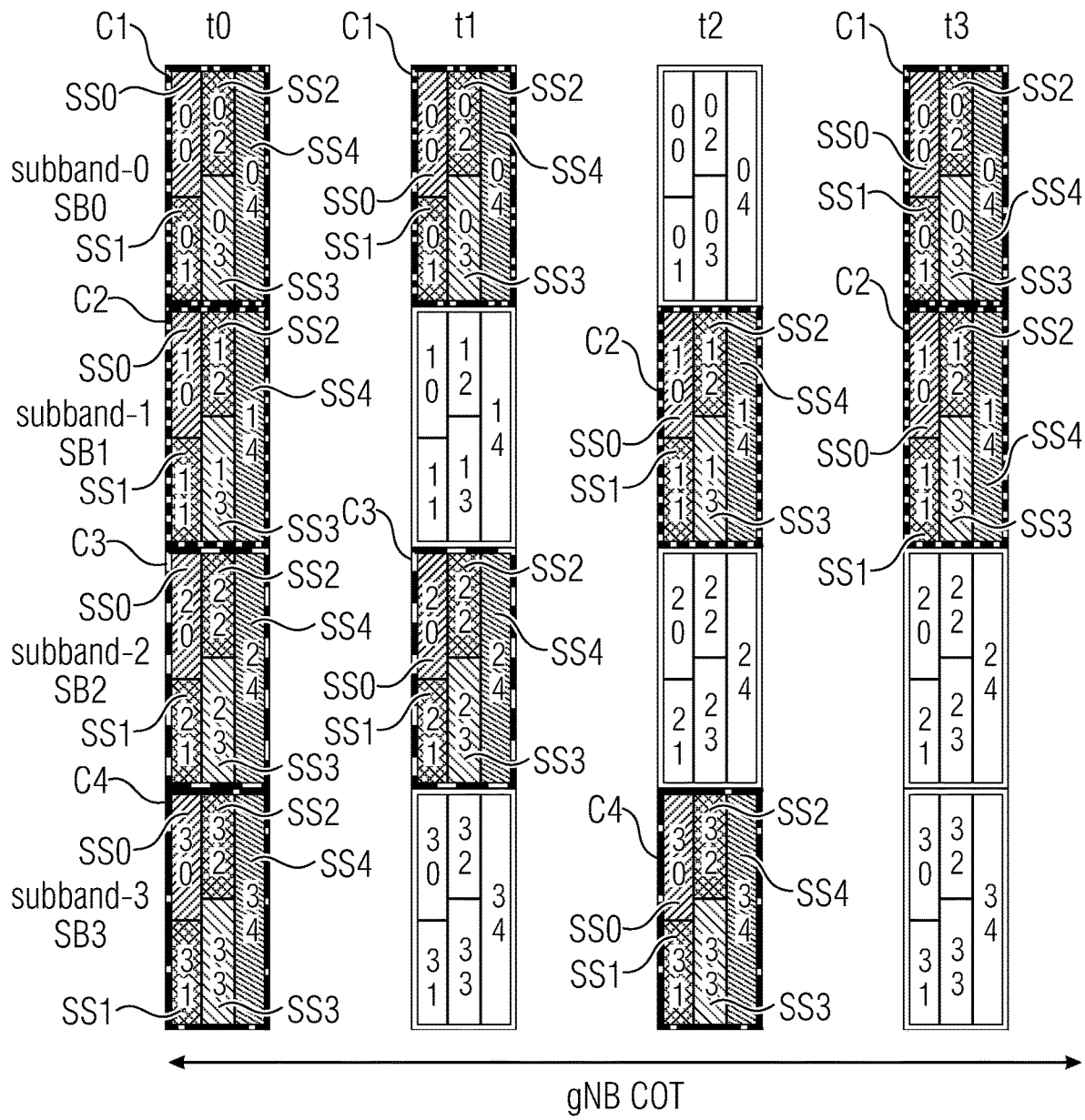
FIG. 12 illustrates an embodiment in accordance with which the CORESET or search space configuration may be consistent across a gNB COT.

As mentioned above, in accordance with embodiments, the wideband operation may be a NR-U wideband operation at least partially in the unlicensed spectrum, so that each subband in the unlicensed spectrum an LBT-procedure is to be carried out so as to see as to whether a transmission on the subband is possible or not. In case a transmission is possible, a transmissions may be performed by a gNB during the channel occupancy time, COT. FIG. 12 assumes the same configuration as explained above with reference to FIG. 10 and FIG. 11 and, in accordance with embodiments, the consistency of the configuration is not only across the subbands as described above with reference to FIG. 10 and FIG. 11 but may also be across time or a combination of time and frequency, dependent on an LBT result for the subbands. FIG. 12 illustrates an embodiment in accordance with which the CORESET or search space configuration may be consistent across a gNB COT, and the one or more CORESETs carrying the control information for the UEs are transmitted once or several times during the COT, as is illustrated in FIG. 12 at the respective instances t0, t1, t2 and t3 that are within the illustrated gNB COT. In accordance with this embodiment, if the UE successfully decodes its PDCCH in SS1 of subband SB1 at time t0, its PDCCH is received at the same location or search space SS1 at times t1, t2 and t3.

However, there may be situations in which the LBT procedure fails one or more of the subbands as is illustrated at times t1, t2 and t3 so that during the gNB COT at times t1, t2 and t3 transmissions occur only on subbands SB0, SB2, SB1, SB3 and SB0, respectively. In such a case, if an LBT procedure fails in a respective subband, the UE may look into the corresponding location or search space in another subband. For example, in FIG. 12, when the UE performs a successful decoding of the PDCCH at t0 in search space SS4 in subband SB1, the UE may continue to receive the scheduling for subsequent times in the same location or search space in the same subband. However, as is shown at t1, the LBT procedure for subband SB1 failed and in this case, the UE, in view of the group information it has for the respective CORESETs, may derive the scheduling information or control information from SS4 in C0 in the subband SB0 and from SS4 in subband SB2 for which the LBT procedure has been successful.

Figure 13:
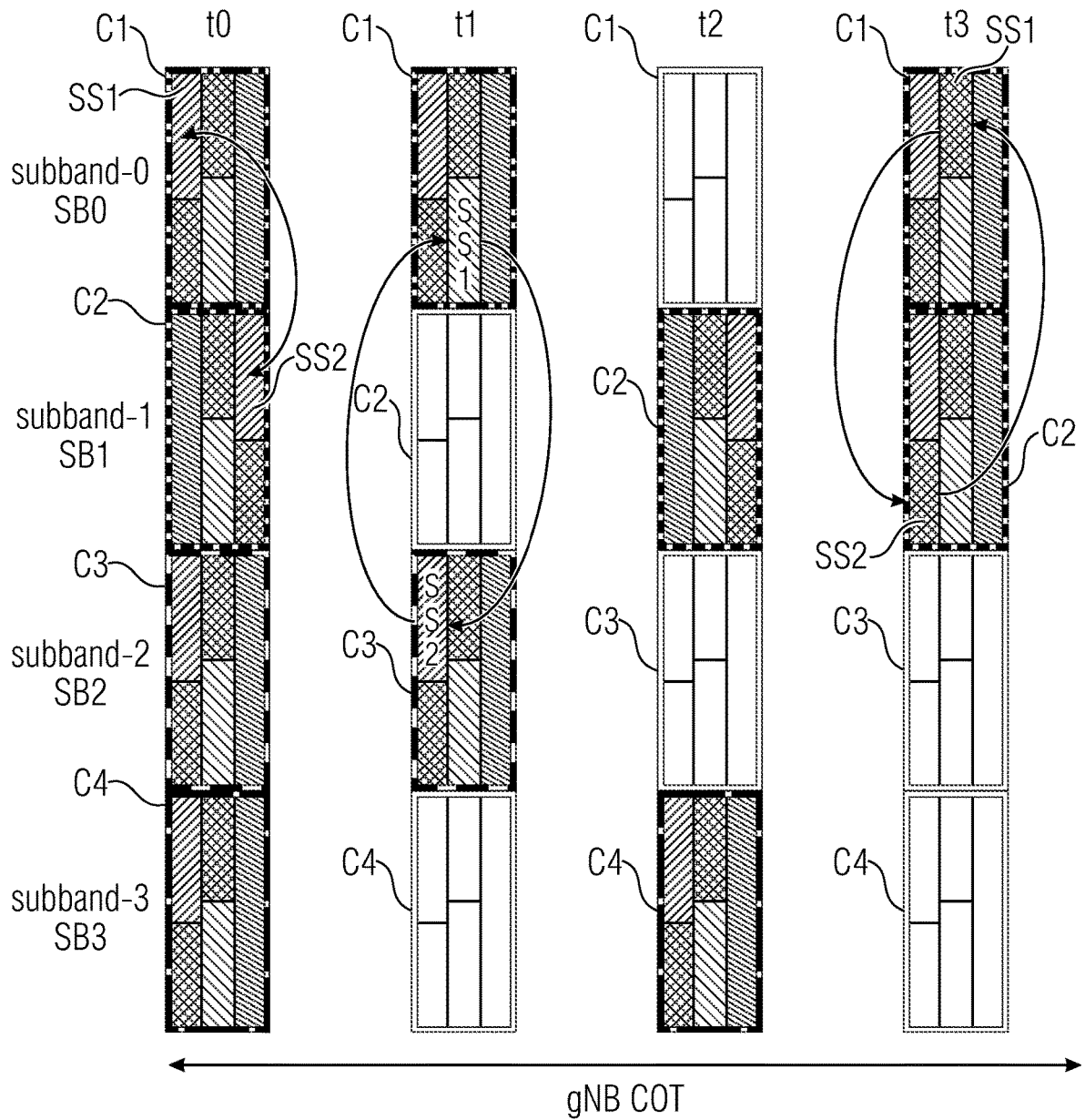

In accordance with further embodiments, an explicit relationship between CORESETs of a group may be provided. For example, the transmitter may include into the respective CORESETs, for example starting from an initial or a default CORESET, further information indicating the other CORESETs transmitted in the other frequency bands and/or at a later time which include search spaces carrying control information for the receiving UE. In other words, when employing the explicit signaling of the groups by the transmitting device, the location of the corresponding control information in another CORESET of a group may be included, for example in the form of DCI information, so that the UE does not expect its control information in other CORESETs. The UE may skip those search spaces within the group which do not include information for it, e.g., control information or PDCCH candidates. FIG. 13 schematically illustrates the signaling of control information locations for a specific UE. As is illustrated in FIG. 13, when assuming an NR-U transmission using three subbands SB0 to SB3 including the CORESETs C1 to C4 which, in accordance with embodiments, form a CORESET group, one or more of the search spaces that are illustrated by the differently shaded rectangular portions of the CORESETs C1 to C4, may include, in addition to the PDCCH candidates for the receiving UE, also additional information, for example in the DCI, pointing to search spaces in other CORESETs of the CORESET group that are located in other subbands.

In other words, the UE may be configured with a set of CORESETs out of which a group, also referred to as a subset, falls into the same time window, e.g. the same slot. Normally, the UE blind decodes on all of the CORSETs in this subset in this slot. However, the control information in accordance with this embodiment, which may be present in some or all of the CORSETs, indicates in which of the CORSETs out of the set or out of the subset or in which of the subbands, there exists valid control information for that specific UE (the receiving UE) in this slot. So the UE may skip not indicated CORSETs although it is configured with them.

In FIG. 13, at time t0 the explicit indication of additional PDCCH information in other subbands is indicated. It is assumed that among the CORESETs C1 to C4 forming the CORESET group only search spaces SS1 and SS2 in CORE-SETs C1 and C2 hold information for the receiving UE so that either one or both of the CORESETs C1, C2 may include respective DCI information pointing towards the locations where additional PDCCH candidates for the receiving UE may be found, in the example of FIG. 13, the search spaces SS1 and SS2. Naturally, other search spaces in the same or different CORESETs may also be signaled.

As may also be seen from FIG. 13, when employing the additional information where further PDCCH candidates for the receiving UE are located within the other CORESETs, also different search space configurations may be employed.

In accordance with embodiments, the information provided, for example, in the DCI may point to the exact time-frequency resources in the subbands as indicated in FIG. 13 for the receiving UE to decode the other PDCCH(s). In accordance with other embodiments, rather than pointing explicitly to the time-frequency resources in the other subbands, like the respective time-frequency resources in the search spaces, in which the other PDCCH(s) are available for decoding, the pointing may only be to the CORESET holding additional information. In case the CORESETs have the same search space configuration across the subbands, the UE may assume that the control information decoded at the time-frequency resources in the first CORESET may be found at the corresponding time-frequency resources in the CORESET to which the UE is directed for further PDCCH candidates. This reduces the number of bits to be transmitted for signaling the locations where the additional PDCCH information for the receiving UE may be found. For example, a bitmap of the subbands or the CORESETs may be provided. For example, in case of five subbands, five bits may be added to a DCI and the least significant bit may point to the lowest subband, and the most significant bit may point to the highest subband or vice versa.

In accordance with further embodiments, the present invention is not limited to the explicit relationship between CORESETs of a group, rather, the signaling of an explicit relationship between CORESETs may also be applied when no CORESET/search space grouping is employed. In accordance with such embodiments, the UE that is served by the gNB uses a plurality of subbands for a communication with one or more entities, like other UE(s) or other gNB(s), in the wireless communication system. Some, e.g., one or more or all of the plurality of subbands include one or more CORESETs carrying control information, e.g., DCI(s), for the UE, and some or all of the CORSETs indicate in which of the CORSETs control information for the respective UE is present.

The embodiment of FIG. 13 is equally applicable for a single-band operation or for a multi- band operation in the licensed spectrum.

FIG. 13 further illustrates an embodiment according to which the transmission of the CORESETs over the multiple subbands SB0 to SB3 within a gNB COT in case of using one or more bands in the unlicensed spectrum for the multi-subband operation or a wideband operation. An LBT procedure for allowing a communication of the respective subbands may fail so that certain subbands may not be used for a communication. In FIG. 13 at times t1, t2 and t3 situations are illustrated in which the second and third subbands SB1, SB3, the first and third subbands SB0, SB2 and the last two subbands SB2 and SB4, respectively, may not be used because an LBT procedure fails. Only the subbands SB0, SB2, the subbands SB1, SB3 and the subbands SB0, SB1, respectively, are available at times t1, t2 and t3, respectively. Also, in such situations, the additional information may be employed for pointing towards other search spaces within CORESETs of the group being located in different subbands. For example, as is illustrated in FIG. 13 at time t1 by the respective arrows pointing from a search space SS1 in CORESET C1 in subband SB0 to a search space SS2 it is indicated in SS1 that SS2 in SB2 holds PDCCH candidates for the receiving UE in CORESET C3 of the same group. A similar situation is depicted in at time t3, where for search space SS1 in CORESET C1 it is indicated that further PDCCH candidates for the receiving UE may be found in search space SS2 in subband SB1 in CORESET C2 of the same CORESET group.

In accordance with further embodiments, the CORESETs or the search spaces of a group may be tied to an explicit or implicit prioritization or ranking which may be indicated by the transmitter, like the gNB or the transmitting UE, when configuring the receiving UE with a CORESET or search space configuration. The UE may perform blind decoding in the order of the prioritization/ranking of the CORESETs or search spaces of a group. In accordance with embodiments, applying the prioritization/ranking allows latency-critical assignments or grants in the high-ranked CORESETs or search spaces to speed up the detection of the PDCCHs. For example, a priority/rank field may be added to the CORESET or search space signaling, for example in the above-described fields of the CORESET or search space configuration.

For example, when considering the CORESET or search space ranking, due to the order of the decoding in the CORESET or the search space, some Das may be decoded earlier than others. In accordance with embodiments, different timing capabilities for scheduling assignments/grants are introduced based on the CORESET in which they are transmitted. For example, the PUSCH preparation time is composed of the maximum time that may be taken to successfully decode a PDCCH and further preparations, such as L2 preparations. The maximum time that may be taken to successfully decode a PDCCH may be reduced for the highest ranked CORESET, which is the CORESET that is decoded first and, hence, the PUSCH preparation time may be assumed to be smaller for these uplink grants when compared to uplink grants in the following CORESETs.

The above described embodiment concerning the explicit signaling of valid control information for a receiving UE may not be restricted to CORESET or search space grouping, rather it may be employed as well in any other single-band or multi-band communication. For example, even without apply any grouping, the DCI may be used to indicate the presence or absence of a DCI for the receiving UE in the frequency (in case of a single-band operation) or in one or more of the plurality of frequency bands (in case of a multi-band operation). Without the grouping additional bits or information may be needed to be put in the DCI. With the grouping, the additional information amount in the DCI may be lower.

In accordance with embodiments, the blind decoding attempts are distributed equally or unequally among the frequency bands or the CORESETs of a group or the search spaces of a group taking into considerations the limitations of the number of blind decoding attempts as defined, for example, in Release-15 based on the subcarrier spacing per slot per serving cell, as shown in the table below (e.g., as in TS 38.213, V15.5.0, Table 10.1-2):

| $\mu$ | Maximum number of monitored PDCCH candidates per slot and per serving cell $M_{PDCCH}^{max,\ slot,\ \mu}$ |
| --- | --- |
| 0 | 44 |
| 1 | 36 |
| 2 | 22 |
| 3 | 20 |

For example, when applying an equal distribution, in case the total number of allowed blind decoding attempts is 44 and in case four frequency bands are available, then 11 blind decoding attempts are performed per frequency band.

In accordance with yet further embodiments, a search space configuration may be copied within a CORESET group. To reduce the configuration overhead of configuring one CORESET per frequency band, the search space configuration may can be configured only once for a group. Therefore, the search space configuration (or parts of it) of a default CORESET may also applied to the other CORESETs of the same CORESET group. The indication of the default CORESET may be explicit, for example by the gNB, or implicit by the order of configuring the CORESETs, e.g., the search space configuration of the first configured CORESET of that group, or the search space configuration of the CORESET having the lowest or highest CORESET ID may be used and copied. In other words, in accordance with embodiments, one or more CORESET configurations maybe confined within a subband, like an LBT subband, and the same pattern or configuration is replicated for the further frequency domain monitoring locations in different subbands, like other LBT subbands. More generally speaking, a default CORSET configuration received for one subband may be used in one or more other subbands. For example, only a frequency information need to be changed in the default configuration to use it in another subband.

In accordance with yet further embodiments, the UE may restrict decoding of CORESETs to those actually being transmitted and carrying control information for the receiving UE. To narrow down the search space for the receiving UE, in addition to the grouping of CORESETs, the UE may also be configured, for example via RRC configuration or reconfiguration, to monitor only a subset of the frequency bands for the PDCCH channel. For example, the UE may be configured to monitor only a continuous frequency range at least for the duration of the CORESETs. In accordance with other examples, a timer may be provided that starts at the end of the CORESETs. After the timer passed the UE may receive UL grants or DL assignments which are located within the whole of the one or more neighboring frequency bands. To indicate the subset of frequency bands to be actually monitored, the search space configuration or the CORESET configuration as provided to the receiving UE may include a control rest set ID monitor field indicating the actual CORESETs to be monitored, for example by specifying them using the control resource set ID. The CORESET(s) monitoring may be a part of the CORESET config in the RRC message, and an example for such an the RRC message is given below:

```
-- ASN1START
-- TAG-SEARCHSPACE-START
SearchSpace ::=              SEQUENCE {
    searchSpaceId               SearchSpaceId,                      OPTIONAL, -- Cond SetupOnly
    controlResourceSetId        ControlResourceSetId
    controlResSetIdMonitor      ControlResourceseId(s),INTEGER/BIT STRING ENUMERATED {...}
    monitoringSlotPeriodicityAndOffSet                  CHOICE {
        sl1                                                 NULL,
        sl2                                                 INTEGER (0..1),
        sl4                                                 INTEGER (0..3),
        sl5                                                 INTEGER (0..4),
        sl8                                                 INTEGER (0..7),
        sl10                                                INTEGER (0..9),
        sl16                                                INTEGER (0..15),
        sl20                                                INTEGER (0..19),
        sl40                                                INTEGER (0..39),
        sl80                                                INTEGER (0..79),
        sl160                                               INTEGER (0..159),
        sl320                                               INTEGER (0..319),
        sl640                                               INTEGER (0..639),
        sl1280                                              INTEGER (0..1279),
        sl2560                                              INTEGER (0..2559)
    }                                                   OPTIONAL, -- Cond Setup
    duration                    INTEGER (2..2559)       OPTIONAL, -- Need R
```

In accordance with other embodiments, the CORESET(s) monitoring may be a part of the SearchSpace config in the RRC message, and an example for such an the RRC message is given below:

```
-- ASN1START
-- TAG-CONTROLRESOURCESET-START
ControlResourceSet ::=       SEQUENCE {
    controlResourceSetId        ControlResourceSetId,
    controlResSetIdMonitor      ControlResourceseId(s), INTEGER/BIT STRING ENUMERATED (...)
    frequencyDomainResources    BIT STRING (SIZE (45)),
    duration                    INTEGER (1..maxCoReSetDuration),
    cce-REG-MappingType         CHOICE {
        interleaved                 SEQUENCE {
            reg-BundleSize              ENUMERATED {n2, n3, n6},
            interleaverSize             ENUMERATED {n2, n3, n6},
            shiftIndex                  INTEGER (0..maxNrofPhysicalResourceBlocks-1)
OPTIONAL -- Need S
        ),
```

```
      nonInterleaved              NULL
   ),
   precoderGranularity            ENUMERATED (sameAsREG-bundle, allContiguousRBs),
   tci-StatesPDCCH-ToAddList      SEQUENCE (SIZE (1..maxNrofTCI-StatesPDCCH)) OF TCI-StateId
OPTIONAL, -- Cond NotSIB1-initialBWP
   tci-StatesPDCCH-ToReleaseList  SEQUENCE (SIZE (1..maxNrofTCI-StatesPDCCH)) OF TCI-StateId
OPTIONAL, -- Cond NotSIB1-initialBWP
   tci-PresentInDCI               ENUMERATED {enabled}
OPTIONAL, -- Need S
   pdcch-DMRS-ScramblingID        INTEGER (0..65535)
OPTIONAL, -- Need S
   ...
}
-- TAG-CONTROLRESOURCESET-STOP
-- ASN1STOP
```

The advantage of restricting the decoding of CORESETs is that the search space of the UE is narrowed down because search spaces in the CORESETs are avoided for which the transmitter, like the gNB, did not provide any control information for the receiving UE. For example, when considering FIG. 13, the UE may be set up or configured with two CORESETs C1, C3, i.e., the UE performs a blind decoding on CORESETs C1, C3. Further, as the configuration of the CORESETs C1, C3 across the subbands is the same, the UE performs a blind decoding on only one of these CORESETs C1, C3 as the location of the second PDCCH, in case the first PDCCH decoding was successful, is implicitly known. In case of employing unlicensed bands, and in case the LBT for one subband failed, the UE does not perform a blind decoding or detection of a CORESET on this subband as the UE first of all checks the result of the LBT, for example, through DMRS decorrelation. In other words, in accordance with embodiments, the blind decoding for search spaces or CORESETs in subbands in which LBT has failed is deactivated.

Assigning, e.g., though an RRC message, CORESETs to monitor allows for obtaining a desired distribution of CORESETs for one or more different UEs across the given frequency bands by the gNB thereby achieving, for example, load balancing. The assignment of each CORESET with a CORESET ID enables the UEs, i.e., those receiving UEs served by the transmitter, to be set up such that they only monitor a particular set of CORESET IDs. Based on the result of the LBT, a simple relationship between the CORESET ID and the number of active frequency bands, N_ASB, may help in redistributing the UEs across the successful frequency bands. For example, when assuming 4X UEs in total that are distributed across four available frequency bands, and when assuming an equal distribution each frequency band is used for X UEs. In case, due to failed LBT, only two of the four frequency bands are available, i.e., N_ASB=2, then a modulo operation may be performed, i.e., CORESET_ID % N_ASB so as to redistribute the UEs so that 2X UEs are in one frequency band and 2X UEs are in another frequency band.

In accordance with yet further embodiments, search space candidates may be redistributed. For example, in case of using one or more bands in the unlicensed spectrum, search space candidates may be distributed or redistributed among the available subbands which have passed their LBT result. This enables the gNB to be more flexible in scheduling and to better adapt to the LBT results. The distribution/redistribution of the search spaces may be valid for all CORESETs except an initial or default CORESET so as to give the gNB enough time to execute the distribution or redistribution.

The distribution/redistribution may be based on an RRC configuration that indicates or fixes the number of candidates dependent on the number of subbands that passed the LBT. In accordance with other embodiments, a formula-based approach may be employed, in accordance with which the UE may calculate the number of candidates in the subbands that passed the LBT. Below, an example an RRC configuration with fixed configuration based on LBT result is depicted, i.e., the number of available CORESETs.

```
   duration                 INTEGER (2..2559)
OPTIONAL,  -- Need R
   monitoringSymbolsWithinSlot   BIT STRING (SIZE (14))
OPTIONAL,  -- Cond Setup
   controlResourceId(s)     SEQUENCE {
      ControlResourceseId   BIT STRING {
         nrofCandidates     SEQUENCE {
            aggregationLevel1    ENUMERATED {n0, n1, n2, n3, n4, n5, n6, n8},
            aggregationLevel2    ENUMERATED {n0, n1, n2, n3, n4, n5, n6, n8},
            aggregationLevel4    ENUMERATED {n0, n1, n2, n3, n4, n5, n6, n8},
            aggregationLevel8    ENUMERATED {n0, n1, n2, n3, n4, n5, n6, n8},
            aggregationLevel16   ENUMERATED {n0, n1, n2, n3, n4, n5, n6, n8}
         }
      }
      .
      .
      .
      ControlResourceseId   BIT STRING {
         nrofCandidates     SEQUENCE {
            aggregationLevel1    ENUMERATED {n0, n1, n2, n3, n4, n5, n6, n8},
            aggregationLevel2    ENUMERATED {n0, n1, n2, n3, n4, n5, n6, n8},
            aggregationLevel4    ENUMERATED {n0, n1, n2, n3, n4, n5, n6, n8},
            aggregationLevel8    ENUMERATED {n0, n1, n2, n3, n4, n5, n6, n8},
```

| | |
|---|---|
| aggregationLevel16 | ENUMERATED {n0, n1, n2, n3, n4, n5, n6, n8} |

}
}
}
}

In accordance with further embodiments, so-called backup CORESETs may be provided. FIG. 14 illustrates an embodiment for providing backup CORESETs to be used within a gNB COT. When assuming the use of unlicensed bands, some or more of the bands may not pass the LBT procedure and, therefore, are not available for transmitting control information by the transmitting entity, like the gNB or another UE, towards the receiving UE. In accordance with embodiments, backup CORESETs may be provided in some or all of the subbands to be transmitted. For example, as is depicted in FIG. 14, for each of the CORESETs C1 to C4 respective backup CORESETs C1' to C4' are provided in different subbands. Thus, backup CORESETs are provided within the gNB COT in the subbands where the LBT result is successful for the subbands that failed the LBT. The indication of the backup locations is either preconfigured in an RRC message with an activation/deactivation based on a physical signaling or transmission, like in the DCI, or is dynamically allocated and communicated in the DCIs. This allows the gNB to schedule more UEs over the LBT successful subbands and helps reducing latency.

FIG. 14 illustrates an example for the use of backup CORESETs, and at time t0 the failure of the LBT result for subband SB1 and subband SB3 results in resources being assigned in time t0:bkup on subband SB0 and SB2. Thus, the receiving UE recognizing that there was no transmission on subband SB1 and SB3 may recognize from its pre-configuration or from the signaling in the received control information in CORESET C1 and CORESET C3 that the backup CORESET may be found in subbands SB0, SB2 at the indicated positions so that the further control information, like further PDCCH(s) may be decoded from the backup CORESETs. At time t1, a similar situation is assumed, however, a failure of subband SB0 and SB2 which results in providing the backup CORESETs C1' and C3' in subbands SB1 and SB3.

In accordance with embodiments, the UE may employ one or more backup CORESETs responsive to the UE not detecting the presence of a CORESET in a subband, e.g., due to a LBT failure or due to the gNB not transmitting the CORESET, and/or responsive to the UE not decoding any control information from any of the subbands.

Although the above embodiment is described in combination with subbands in the unlicensed spectrum, backup CORESETs may also be provided in the licensed spectrum so as to allow decoding the control information in case the UE does not successfully decode the control information from one or more CORESETs. In such a situation, the UE may use the backup CORESET(s) at a different frequency resource and/or time resource in which a decoding is successful. The different frequency resource and/or time resource may be within the same frequency band or within the different frequency bands In accordance with yet other embodiments of the present invention, a CORESET may be restricted to borders between adjacent frequency bands, e.g. subband borders in case of NR-U. This approach applies equally for approaches not employing CORESET or search space grouping and for approaches employing CORESET or search space grouping. Some or all of the frequency bands may be in the unlicensed spectrum. FIG. 15 illustrates schematically an embodiment restricting the search space to frequency band borders. For example, the search space may span 20 MHz, and in FIG. 15 search spaces 00 to 11 are indicated which are located at resources in the respective frequency bands SB1 and SB2 that are at the borders of the frequency bands SB1 and SB2, i.e., the search spaces 00, 10 and the search spaces 01, 11, respectively, span a consecutive frequency range in both frequency bands. In the embodiment depicted in FIG. 15, other search spaces may be provided at other locations in a frequency band, like in the embodiments described above. FIG. 15 further illustrates search spaces 21 to 31 are indicated which are located at resources at the borders of frequency bands SB3 and SB4. By restricting the search space between frequency bands to a predefined frequency range at the frequency band borders, a UE that decodes multiple frequency bands performs a blind decoding only on a limited bandwidth, like the 20 MHz indicated in FIG. 15. Instead of decoding the full bandwidth of the two frequency bands SB1 and SB2, for example, instead of decoding 40 MHz bandwidths, only the smaller bandwidth is to be considered. The placement of the search spaces as described above, may be preconfigured so that the UE may typically perform a blind decoding on two or four or more neighboring frequency bands simultaneously depending on the UEs RF capabilities. Further, the UE may be configured to monitor only the core bandwidths and does not expect to receive any PDCCH information outside the CORESET bandwidths, at least for the duration of the CORESET or for the duration of a pre-configured timer.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a UE may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator, or a Wifi non-AP STA (AP=Access Point, STA=Station), e.g. 802.11ax or 802.11be. In accordance with embodiments, a base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system, or a Wifi AP STA, e.g. 802.11ax or 802.11be.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
sTTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A user device, UE, for a wireless communication system,
   wherein the UE is to be served by a base station and is to use one or more frequency bands for a communication with one or more entities in the wireless communication system, wherein a plurality of control resource sets, CORESETs, or a plurality of search spaces is provided in the one or more or all of the frequency bands, each CORESET comprising one or more search spaces carrying control information for the UE,
   wherein the UE is to group
   some or all of the CORESETs into respective CORESET groups, or
   some or all of the search spaces into respective search space groups,
   wherein a CORESET group comprises some or all CORESETs within a certain time window, and wherein a search space group comprises some or all search spaces within the certain time window,
   wherein the grouping is responsive to one or more of
   one or more group IDs the UE is configured with, each group ID pointing to or indicating a CORESET group or a search space group, and
   determining CORESETs or search spaces to be within the same time window,
   wherein the UE is to concatenate or combine the CORESETs or the search spaces of a group, wherein a virtual CORESET or a virtual search space is defined, and
   wherein the UE is to stop blind decoding once a certain number of control parameters was found within the virtual search space or the virtual CORESET.

2. The UE of claim 1, wherein
   the UE is to use one frequency band for the communication, and a CORESET group/search space group comprises some or all CORESETs/search spaces in the one frequency band that are provided within a certain time window, or
   the UE is to use a plurality of frequency bands for the communication, and a CORESET group/search space group comprises some or all CORESETs/search spaces in one or more or all of the plurality of frequency bands that are provided within a certain time window.

3. The UE of claim 1, wherein the UE is to be configured with a CORESET group information element, the CORESET group information element indicating CORESET configurations to be considered for the grouping.

4. The UE of claim 1, wherein the UE is to be configured with a search space group information element, the search space group information element indicating search spaces and associated CORESETs being part of the same search space group.

5. The UE of claim 1, wherein the UE is to be configured with one or more CORESET information elements (ControlResourceSet) and one or more search space information elements (SearchSpace), wherein a search space information element comprises a search space group indication element (searchSpaceGroup) comprising the group ID (group Index).

6. The UE of claim 1, wherein the UE is to be configured with a parameter activating or deactivating the grouping.

7. The UE of claim 1, wherein the UE is to coordinate decoding the control information for the UE from the search spaces using the grouping.

8. UE of claim 1, wherein the UE is to receive a default CORESET configuration for a group, and to configure the remaining CORESETs of the group according to the default CORESET configuration.

9. The UE of claim 8, wherein, to configure the one or more CORESETs, the UE is to apply at least a part of a search space configuration of the default CORESET to the other CORESETs of the same group.

10. The UE of claim 8, wherein the default CORESET configuration is indicated:
    explicitly; or
    implicitly.

11. The UE of claim 8, wherein the UE is to replicate a default CORESET configuration for further frequency domain monitoring locations in one or more subbands that are different from the subband associated with the default CORESET configuration.

12. The UE of claim 1, wherein,
    in case the UE successfully finds control information in a current CORESET comprising a certain aggregation level, AL, the UE is not to expect control information for itself in a CORESET with another AL, or
    in case the UE successfully finds control information in a current search space comprising a certain aggregation level, AL, the UE is not to expect control information for itself in a search space with another AL.

13. The UE of claim 1,
    wherein, in case the UE successfully finds control information in a current CORESET, the UE is not to expect control information for itself in another CORESETs, or
    wherein, once the UE successfully decoded one Physical Downlink Channel, PDCCH, in a CORESET the UE is to stop or deactivate the blind decoding in other CORESETs of the CORESET group, or
    wherein, responsive to successfully detecting a Physical Downlink Channel, PDCCH in a certain subband for a time window, the UE is to continue to blind decode only within frequency domain monitoring location, i.e. a CORSET of a CORESET group, at which the PDCCH is found for the search space associated with the found PDCCH or a preconfigured subset or all search spaces which are associated with the CORESET group, or wherein the CORESETs or search spaces of a certain group are prioritized or ranked, and wherein the UE is to blind decode the CORESETs or search spaces of the certain group according to the prioritization or ranking thereof.

14. The UE of claim 1,
wherein one or more or all of the frequency bands are unlicensed subbands, and wherein
following a successful Listen-Before-Talk, LBT, for one or more unlicensed subbands, a communication is allowed during a certain transmission time, (COT) in an available unlicensed subband,
following a failed Listen-Before-Talk, LBT, for one or more unlicensed subbands, a communication is not allowed in a non-available unlicensed subband, and the UE is to not perform a communication on the non-available unlicensed subbands, or
wherein the UE is to monitor only a subset of the CORESETs carrying control information for the UE, or
wherein the UE is to monitor only a subset of the CORESETs carrying control information, for the UE.

15. A wireless communication system, comprising:
one or more UEs of claim 1, and
one or more base stations, BSs.

16. A method for operating a wireless communication system,
wherein a UE is served by a base station and uses one or more frequency bands for a communication with one or more entities in the wireless communication system, wherein a plurality of control resource sets, CORESETs, or a plurality of search spaces is provided in the one or more or all of the frequency bands comprise one or more CORESETs, each CORESET comprising one or more search spaces carrying control information for the UE,
wherein method comprises grouping some or all of the CORESETs into respective CORESET groups, or some or all of the search spaces into respective search space groups,
wherein a CORESET group comprises some or all CORESETs within a certain time window, and wherein a search space group comprises some or all search spaces within the certain time window, and
wherein the grouping is responsive to one or more of
one or more group IDs the UE is configured with, each group ID pointing to or indicating a CORESET group or a search space group, or
determining CORESETs or search spaces to be within the same time window,
wherein the UE concatenates or combines the CORESETs or the search spaces of a group, wherein a virtual CORESET or a virtual search space is defined, and
wherein the UE stops blind decoding once a certain number of control parameters was found within the virtual search space or the virtual CORESET.

17. A non-transitory digital storage medium having a computer program stored thereon to perform, when said computer program is run by a computer, a method for operating a wireless communication system,
wherein a UE is served by a base station and uses one or more frequency bands for a communication with one or more entities in the wireless communication system, wherein a plurality of control resource sets, CORESETs, or a plurality of search spaces is provided in the one or more or all of the frequency bands comprise one or more CORESETs, each CORESET comprising one or more search spaces carrying control information for the UE,
wherein method comprises grouping some or all of the CORESETs into respective CORESET groups, or some or all of the search spaces into respective search space groups,
wherein a CORESET group comprises some or all CORESETs within a certain time window, and wherein a search space group comprises some or all search spaces within the certain time window, and
wherein the grouping is responsive to one or more of
one or more group IDs the UE is configured with, each group ID pointing to or indicating a CORESET group or a search space group, and
determining CORESETs or search spaces to be within the same time window,
wherein the UE concatenates or combines the CORESETs or the search spaces of a group, wherein a virtual CORESET or a virtual search space is defined, and
wherein the UE stops blind decoding once a certain number of control parameters was found within the virtual search space or the virtual CORESET.

* * * * *